United States Patent
Shah et al.

[19]

[11] Patent Number: 5,991,525
[45] Date of Patent: Nov. 23, 1999

[54] METHOD FOR REAL-TIME NONLINEAR SYSTEM STATE ESTIMATION AND CONTROL

[75] Inventors: Sunil C. Shah, Mountain View; Pradeep Pandey, San Jose, both of Calif.

[73] Assignee: Voyan Technology, Santa Clara, Calif.

[21] Appl. No.: 08/917,053

[22] Filed: Aug. 22, 1997

[51] Int. Cl.$^6$ .................................................. G05B 13/04
[52] U.S. Cl. ................................ 395/500.23; 364/148.1; 364/149; 364/151; 708/303; 708/819
[58] Field of Search ..................... 364/148, 149, 364/150, 151, 153, 571.01, 578, 512, 158, 148.1; 395/500.23; 708/819, 300, 303

[56] References Cited

U.S. PATENT DOCUMENTS

| | | | |
|---|---|---|---|
| 4,577,270 | 3/1986 | Sugano et al. | 364/151 |
| 4,852,018 | 7/1989 | Grossberg et al. | 364/513 |
| 4,881,178 | 11/1989 | Holland et al. | 364/513 |
| 4,974,191 | 11/1990 | Amirghodsi et al. | 364/900 |
| 5,040,214 | 8/1991 | Grossberg et al. | 381/43 |
| 5,060,132 | 10/1991 | Beller et al. | 364/158 |
| 5,191,521 | 3/1993 | Browsilow | 364/160 |
| 5,214,715 | 5/1993 | Carpenter et al. | 382/15 |
| 5,355,305 | 10/1994 | Seem et al. | 364/161 |
| 5,377,307 | 12/1994 | Hoskins et al. | 395/22 |
| 5,412,060 | 5/1995 | Wulff et al. | 528/196 |
| 5,453,226 | 9/1995 | Kline et al. | 264/40.1 |
| 5,464,369 | 11/1995 | Federspiel | 454/256 |
| 5,506,794 | 4/1996 | Lange | 364/571.01 |
| 5,517,594 | 5/1996 | Shah et al. | 392/416 |
| 5,740,033 | 4/1998 | Wassick et al. | 364/149 |
| 5,748,847 | 5/1998 | Lo | 395/23 |
| 5,805,447 | 8/1998 | Teng et al. | 364/157 |

OTHER PUBLICATIONS

Ahmed et al., "Modified Extende Kalman Filtering", IEEE, 1994, pp. 1322–1326.

Rutenbar, Rob A., "Stimulated Annealing Algorithms: An Overview", IEEE Circuits and Devices Magazine, Jan. 1989, vol. 5, No. 1, pp. 19–26.

Anderson, Brian D. O. and Moore, John B., "Optimal Filtering", Prentice–Hall Information and System Science Series, 1997 pp. 1–61, 148–149, 192–197.

Search Report, PCT/US98/17439, Date mailed Dec. 29, 1998.

*Primary Examiner*—Kevin J. Teska
*Assistant Examiner*—Thai Phan
*Attorney, Agent, or Firm*—Blakely, Sokoloff, Taylor & Zafman LLP

[57] ABSTRACT

A method for the estimation of the state variables of nonlinear systems with exogenous inputs is based on improved extended Kalman filtering (EKF) type techniques. The method uses a discrete-time model, based on a set of nonlinear differential equations describing the system, that is linearized about the current operating point. The time update for the state estimates is performed using integration methods. Integration, which is accomplished through the use of matrix exponential techniques, avoids the inaccuracies of approximate numerical integration techniques. The updated state estimates and corresponding covariance estimates use a common time-varying system model for ensuring stability of both estimates. Other improvements include the use of QR factorization for both time and measurement updating of square-root covariance and Kalman gain matrices and the use of simulated annealing for ensuring that globally optimal estimates are produced.

34 Claims, 11 Drawing Sheets

METHOD FOR REAL-TIME NONLINEAR SYSTEM STATE ESTIMATION AND CONTROL

FIELD OF INVENTION

The invention pertains to the field of nonlinear system state estimation and control in which the nonlinear system is describable by a set of nonlinear differential equations. More specifically the invention relates to the use of extended Kalman filtering (EKF) type techniques for state estimation and system control.

BACKGROUND TO THE INVENTION

Observation of a physical system for understanding its behavior requires obtaining access to key parameters (state variables) within the system. Often, these state variables are not directly available for observation so that they must be inferred from indirect and noisy measurements. Optimal linear estimation theory has been developed for estimating these state variables by producing a minimal error estimate from their contaminated images. The need for optimal estimation technology is widespread and includes such diverse applications as monitoring system behavior in hostile environments, estimating system parameters for system modeling, estimating (detecting) messages in communication systems, remote measuring systems, and controlling of physical systems.

Optimal estimation techniques are based on statistical signal processing (filtering) techniques for extracting a statistical estimate of the desired state variables from inaccurate and distorted measurements by minimizing a prescribed error function. The form of the error function determines the nature of the estimator optimality.

Kalman filtering (Kalman, R. E., "A New Approach to Linear Filtering and Prediction Problems", Trans. ASME, J. Basic Eng., Vol. 82D, pp. 34–45, March 1960) is an optimal filtering technique commonly used for estimating state variables of a linear system. Kalman filtering is a time domain operation that is suitable for use in estimating the state variables of linear time-varying systems that can be described by a set of linear differential equations with time-varying coefficients (linear differential equations with constant coefficients being a special case). Although Kalman filtering has found application in state estimation in many systems that may be approximately described as linear, the basic Kalman filter technique can not adequately accommodate general nonlinear systems. Because nonlinear systems are common, attempts have been made to adapt the Kalman filter to estimation of states in nonlinear systems by quasi-linearization techniques. These adaptations, when restricted to computationally feasible methods, result in sub-optimal estimators which do not yield a minimal (optimal) error estimation.

Because it is desirable to use digital computers for applying Kalman filter techniques, discrete-time (time-sampled) adaptations have been developed. Discrete Kalman filtering is ideally suited for estimation of states in discrete-time systems that can be properly described by a set of finite difference equations with discrete time-varying coefficients. However, because of the strong incentives for incorporating digital signal processing techniques for continuous-time Kalman filter estimation, extensive use has been made of discrete Kalman filters in continuous-time system state estimation.

Because Kalman filters (and other state variable estimators, such as the Luenberger observer (Luenberger, D. G., "Observing the State of a Linear System", IEEE Trans. On Military Electronics, pp. 74–80, April 1964)) are based on a model of a system whose states are to be estimated, the use of a discrete Kalman filter for estimating the states of a continuous system implies modeling the continuous system as a discrete time-sampled system in which integrators are replaced by accumulators and continuous time-varying coefficients are replaced by discrete time-varying coefficients. In addition to propagating the state estimates, estimators may propagate state estimate error covariance using a model that may be a different approximation to the original continuous system model. As the time interval between sampled data points is increased, the approximation error for each model increases and may result in model behaviors that departs drastically from the actual system behavior.

When the effects of modeling continuous time systems by using discrete-time models are combined with the inaccuracies of quasi-linear model approximations to nonlinear systems, estimator error stability can be severely impaired. Loss of stability means severe departure between the actual state values and the estimates. Increasing the sampling rate of the model produces smaller finite difference intervals with improved performance but often at an unacceptable cost for the increased computational burden.

Optimal state estimators for linear systems form the basis for optimal control in the so-called Linear Quadratic Gaussian (LQG) control problem (Reference: Applied Optimal Control, A. E. Bryson and Y. C. Ho, John Wiley & Sons, 1975). System state variables are estimated using optimal estimation techniques and then a quadratic objective performance criterion is applied to establish a control design strategy. Kalman filtering is commonly used as a means for estimating the state variables of a system. When the estimated state variables are combined, using the control law based on the objective performance criterion (or performance index), optimal LQG control system results.

The objective performance criterion summarizes the objectives of the system by the performance index, J, which is a mathematical expression that must be minimized in order to meet the objectives of the system. For example, the performance index can represent the final error, total time, or the energy consumed in meeting the system objective. The various possible performance indices may be used individually or in combination so that more than one objective is satisfied.

FIG. 1 is a block diagram of a basic state variable control system 10 in which the physical plant 11 that is to be controlled has a vector (multichannel) input, u(t), and a state vector, x(t), with vector elements corresponding to the set of state variables representing the attributes of plant 11 that are to be controlled. State vector x(t) is generally not directly accessible but through the measurement vector, z(t), which are available from a set of appropriate sensors in sensor unit 12. The measurement vector may have more or less elements than the state vector. These measurements can also be contaminated by measurement noise due to the system environment and/or due to sensor noise. Typically, the sensors are transducers that convert the various physical elements of the state vector representing diverse physical activity (e.g. heat, light, mass, velocity, etc.) into electrical signal representations suitable for additional signal processing. State observer 13 accepts vector z(t) as a noisy and distorted representation of the state vector x(t) from which an estimated state vector, $\hat{x}(t)$, of the state vector is made. The estimated state vector, $\hat{x}(t)$, is a statistical estimate of necessity because of the stochastic nature of the random noise introduced into the measurement process and into the dynamics. The estimated state vector, $\hat{x}(t)$, is then used by controller ($-C(t)$) 14 to form a suitable input vector, $u(t)$, to drive plant 11. Because of the stochastic nature of real control systems, the performance index, J, must be expressed as an average value, $\bar{J}=E\{J\}$, where $E\{.\}$ is the expectation operator. In order to accommodate time-varying plants, i.e. plants that change physical attributes as a function of time, controller 14 may also be a time-varying controller based upon a time-varying performance index, $\bar{J}(t)$, and a time varying state observer 13.

FIG. 2 is a signal flow block diagram representing a plant such as plant 11 of FIG. 1. Summing junction 111 provides at its output vector $\dot{x}(t)$, the time derivative of state vector $x(t)$ that is the sum of three inputs to summing junction 111: the output vector $F(t)x(t)$ of feedback gain unit 112, an input signal $\Gamma(t)u(t)$ from gain unit 116 and an input noise signal $G(t)w(t)$ from gain unit 114. The input noise, $w(t)$, is generally assumed to be white gaussian noise of zero mean. The state vector time-derivative, $\dot{x}(t)$, applied to vector integrator 110 for producing the state vector, $x(t)$, which is applied to vector feedback gain unit 112 and to vector gain unit 113 of measurement system 120. The output of gain unit 113, $y(t)$, is combined with a white noise vector, $v(t)$, by vector summing junction 115 for producing output measurement vector $z(t)$. The system satisfies the following differential equations:

$$\dot{x}(t)=F(t)x(t)+\Gamma(t)+G(t)w(t)$$

$$y(t)=H(t)x(t) \tag{1}$$

$$z(t)=y(t)+v(t)$$

where $w(t)$ and $v(t)$ are normal zero mean vectors with covariance matrices $Q(t)$ and $R(t)$, respectively, i.e.

$$w(t) \approx N(0,Q(t)\delta(t))$$

$$v(t) \approx N(0,R(t)\delta(t)),$$

$\delta(t)$ is the Dirac delta function, and $u(t)$ is a yet to be defined input control vector. Also, both noise vectors are usually assumed to be independent, i.e. $E\{w(t)v(t)\}=0$.

As shown in FIG. 3, the state observer 13 of FIG. 1 can be implemented as a Kalman filter that has identical elements with those identified as integrator 110, input gain unit 116, measurement gain unit 113, and state vector feedback gain unit 112, respectively corresponding to elements 130, 136, 133, and 132 in FIG. 3. The output, $z(t)$, from sensor unit 12 of FIG. 1 is applied together with $\hat{z}(t)$, the output of feedback gain unit 133, to the input of vector adder 139 for forming the difference, $(z(t)-\hat{z}(t))$, representing error in the Kalman filter estimate of the vector $z(t)$. The difference is applied to Kalman gain unit 137 (for applying the Kalman gain matrix to the difference) and supplying its output to one input of vector adder 138. A second input to vector adder 138 is the output of vector gain unit 132 that forms the product $F(t)\hat{x}(t)$, so that the vector adder output represents an estimate, $\hat{\dot{x}}(t)$, of the time derivative of the state vector. The Kalman filter signal flow block diagram of FIG. 3 supports the following vector differential equation:

$$\hat{\dot{x}}(t)=F(t)\hat{x}(t)+\Gamma(t)u(t)+K(t)[z(t)-H(t)\hat{x}(t)] \tag{2}$$

and $$\hat{x}(0)=x_0.$$

Equation (2) requires the solution of the following continuous Ricatti equation for $P(t)$, the covariance matrix of the state vector, $x(t)$, in order to solve for the Kalman gain matrix, $K(t)$ in equation (2).

$$\dot{P}(t)=F(t)P(t)+P(t)F^T(t)+G(t)Q(t)G^T(t)-K(t)R(t)K^T(t) \tag{3}$$

where $[.]^T$ indicates the matrix transpose operation, $P(0)=P_0$, and $P(t)=E\{(x(t)-\hat{x}(t))(x(t)-\hat{x}(t))^T\}$. Thus, the covariance matrix $P(t)$ is based on the difference between the actual state represented by vector $x(t)$ and the estimated state represented by vector $\hat{x}(t)$.

The Kalman gain matrix, $K(t)$, is $$K(t)=P(t)H^T(t)R^{-1}(t) \tag{4}$$

Equations (2)–(4) specify the Kalman filter observer that is the optimal linear filter for estimating the minimum variance, conditional mean state vector of plant 11 of FIG. 1. Equations (1) describe the signal model used in constructing the Filter equations (2)–(4).

The control vector, $u(t)$, may be considered to be an exogenous variable whose functional form can be prescribed for altering the dynamic properties of the plant. An optimal control vector obtains when $u(t)$ is chosen to minimize a prescribed performance index, $\bar{J}$, as previously discussed.

A quadratic performance index is commonly used that minimizes the weighted integrated quadratic error and the quadratic value (energy) of the control vector and the weighted quadratic error of the state vector at a designated final time, $t_f$, as follows:

$$\bar{J} = E\{x(t_f)^T V_f x(t_f) + \int_{t_0}^{t_f} [x^T(t)V(t)x(t) + u^T(t)U(t)u(t)]dt\} \tag{5}$$

where $V_f$, $V(t)$, and $U(t)$ are weighting matrices for establishing the relative importance of the three quadratic terms. Minimization of $\bar{J}$ is performed subject to the conditions implied by the plant differential equations (1) and a solution for $u(t)$ is obtained in terms of the estimated state vector, $\hat{x}(t)$ as $$u(t)=-C(t)\hat{x}(t) \tag{6}$$

where controller gain matrix $C(t)$ is computed using the matrix Riccati equation for control and the certainty-equivalence principle. (Reference: Applied Optimal Control, A. E. Bryson and Y. C. Ho, John Wiley & Sons, 1975)

FIG. 4 is a block diagram of an optimal controller 15 controlling plant 11 by using measurements obtained by sensor unit 12. The optimal controller comprises a Kalman filter 13, for operating on the output of sensor unit 12 and producing an estimated state vector, and a controller gain matrix unit 14 that operates on the estimated state vector to produce the control vector for controlling the plant.

FIG. 5 is a signal flow block diagram of a discrete time sampled model 20 for a physical plant that is to be controlled. The most obvious difference between the continuous signal model of FIG. 2 is that integrator 110 has been replaced by time delay unit 200 that introduces a vector delay of T seconds. At time $t=kT$, the discrete state vector, $x_k$, appears at the output of delay unit 200. Vector adder 201 accepts the output, $F_k x_k$, of matrix gain unit 203, control vector $\Gamma_k u_k$ from matrix gain unit 206, and the output, $G_k w_k$, of matrix gain unit 202 and presents as the vector sum, $x_{k+1}$, corresponding to the state vector for $t=(k+1)T$. The measurement portion of the plant is represented by vector gain matrix unit 204, that operates on state vector $x_k$ to produce $y_k$, and vector adder 205 that adds white noise vector $v_k$ to $y_k$ for producing output measurement vector $z_k$. Noise vectors $w_k$ and $v_k$ are assumed to be independent discrete processes.

As a result the following set of finite difference equations, that are comparable to equations (1), apply to FIG. 5:

$$x_{k+1} = F_k x_k + \Gamma_k u_k + G_k w_k$$

$$y_k = H_k x_k$$

$$z_k = y_k + v_k \qquad (7)$$

$$E\{v_k v_1\} = R_k \delta_{k1}$$

$$E\{w_k w_1\} = Q_k \delta_{k1}$$

FIG. 6 is a block diagram of the discrete Kalman filter, analogous to the continuous Kalman filter of FIG. 3, that accepts the output measurement vector, $z_k$, of the discrete time sampled plant model of FIG. 5 and produces a conditional estimated state vector, $\hat{x}_{k|k-1}$, at the output of vector time delay unit 200. The vector, $\hat{x}_{k|k-1}$, is fedback through vector gain unit 303 ($F_k - K_k H_k^T$) to vector adder 301 to be added to the output of Kalman matrix gain unit 302 and added to input control vector $\Gamma_k u_k$ from gain unit 206.

The following finite difference equations apply to the discrete Kalman filter of FIG. 6.

$$\hat{x}_{k+1|k} = (F_k - K_k H_k^T)\hat{x}_{k|k-1} + \Gamma_k u_k + K_k z_k,$$

where $$\hat{x}_{0|-1} = E\{\hat{x}_0\} = \bar{x}_0$$

$$K_k = F_k \Sigma_{k|k-1} H_k [H_k^T \Sigma_{k|k-1} H_k + R_k]^{-1}$$

$$\Sigma_{k+1|k} = F_k [\Sigma_{k|k-1} - \Sigma_{k|k-1} H_k (H_k^T \Sigma_{k|k-1} H_k + R_k)^{-1} H_k^T \Sigma_{k|k-1}] F_k^T + G_k Q_k G_k^T \qquad (8)$$

where $$\Sigma_{0|-1} = P(0) = P_0,$$

and $$\hat{x}_{k|k} = \hat{x}_{k|k-1} + \Sigma_{k|k-1} H_k (H_k^T \Sigma_{k|k-1} H_k + R_k)^{-1} (z_k - H_k^T \hat{x}_{k|k-1})$$

$$\Sigma_{k|k} = \Sigma_{k|k-1} + \Sigma_{k|k-1} H_k (H_k^T \Sigma_{k|k-1} H_k + R_k)^{-1} H_k^T \Sigma_{k|k-1}$$

In the above expressions involve conditional vectors, $\hat{x}_{k|k-n}$, and covariance matrices, $\Sigma_{k|k-a}$ for n=0 or 1, which should be interpreted to mean that they represent predicted values conditioned on the measured observations $[z_0 z_1 \ldots z_{k-a}]$ as follows:

$$\hat{x}_{k|k-n} = E\{x_k | z_0 z_1 \ldots z_{k-n}\}$$

$$\Sigma_{k|k-n} = E\{\hat{x}_{k|k-n} \hat{x}_{k|k-n}^T | z_0 z_1 \ldots z_{k-n}\} \qquad (9)$$

The Kalman filter controller shown in FIG. 4 would apply to the discrete case described above if the following changes were implemented: replace Kalman filter 13 with the discrete Kalman filter of FIG. 6; provide sensor unit 12 with ADC means for periodically sampling and quantizing z(t); and provide controller 14 with a digital-to-analog converter (DAC) output with first order hold output means if an analog input to plant 11 is required. In this manner, the input would be held constant during the interval between successive samples of z(t). The control 14 gain matrix would be calculated by minimizing an appropriate discrete performance index, J(k).

Because the computation of the state vector covariance, $\Sigma$, can lead to numerical instability, it is advantageous to deal with the square-root, S, of the covariance, $\Sigma = SS^T$, because the product $SS^T$ can not lead to a matrix that fails to be nonnegative definite as a result of computational errors. Also, the numerical conditioning of S is generally much better than that of $\Sigma$ and only requires half as many significant digits for computation. The covariance square root matrix, $S_{k|k}$, can be update using a matrix transformation as follows:

$$\begin{bmatrix} S_{k+1|k}^T \\ 0 \end{bmatrix} = T \begin{bmatrix} S_{k|k}^T F_k^T \\ Q_k^{T/2} G_k^T \end{bmatrix} \qquad (10)$$

where $S_{k+1|k}^T$ is a nxn upper triangular matrix and T is any orthogonal matrix that makes $S_{k+1|k}^T$ upper triangular. Similarly, the both time and covariance updates may be obtained by the following operations:

$$\hat{x}_{k|k} = \hat{x}_{k|k-1} + \tilde{K}_k (R_k + H_k^T \Sigma_{k|k-1} H_k)^{-1/2} (z_k - \qquad (11)$$

$$H_k^T x_{k|k-1}) \begin{bmatrix} (R_k + H_k^T \Sigma_{k|k-1} H_k)^{T/2} & \tilde{K}_k \\ 0 & S_{k|k}^T \end{bmatrix} =$$

$$\tilde{T} \begin{bmatrix} R_k^{T/2} & 0 \\ S_{k|k-1}^T H_k & S_{k|k-1}^T \end{bmatrix}$$

where $\tilde{T}$ is an orthogonal matrix that causes the transformed matrix on the left to be upper triangular (Reference: B. D. O. Anderson and J. Moore, Optimal Filtering, Prentice Hall, 1979 pp. 148–149).

The discrete model described above replaces differential equations needed to describe most practical physical systems that operate in the continuous domain by finite difference equations that may not adequately describe the physical system that is to be controlled. The discrete model is only an approximation to the integration process of the continuous model that may require high sampling rates (and consequently more processing) in order to provide a acceptable approximation to the continuous model. This problem becomes more acute when these techniques are applied to nonlinear time varying system models that more accurately describe practical processing systems. Prior art has attempted to extend the discrete Kalman filter control technique from the linear time-varying type of system to nonlinear time-varying systems by a method known as extended Kalman filtering (EKF).

A rather general nonlinear model for a nonlinear plant is given by the following nonlinear differential equations:

$$\dot{x} = f(x,u) + w$$

$$z = g(x) + v \qquad (12)$$

where u,v,w,x, and z represent the same variables as previously defined but with the dependent time variable, t, suppressed, f(.) is a nonlinear function of both the state vector, x, and the input vector, u, and g(.) is a nonlinear function of the state vector, x. The corresponding nonlinear plant block diagram model, 40, is shown in FIG. 7 where input unit 401 accepts input vector u and state variable feedback x and produces the nonlinear output vector f(x,u) to which vector summer 402 adds noise vector w to form the differentiated state variable vector, $\dot{x}$. Vector integrator 403 operates on $\dot{x}$ to produce state vector x at the output. State vector x is fedback to input unit 401 and to measurement nonlinear transformation unit 404 that transforms vector x by forming the output vector g(x) to which noise vector v is added for producing the measurement observation vector z.

Because the optimal nonlinear system state vector estimation is generally computationally intractable, common practical approaches approximate equations (12) by using finite difference equations and by adapting the linear methods discussed above after linearizing the above nonlinear plant differential equations (12) along a nominal trajectory, so that the equations take on the following form:

$$x_{k+1} = A_k x_k + B_k u_k + w_k$$

$$z_k = C_k x_k + v_k,$$

for $$k = 1, 2, \ldots \tag{13}$$

These equations represent a time-varying linear model with index k, and discrete time state vectors. The nominal trajectory for the non-linear equations (12) must be available for computation of the linearized model.

Anderson et al. (op. cit., p. 195) apply Kalman filter methods to obtain a suboptimal estimator for the discrete model given by the following equations:

$$x_{k+1} = f_k(x_k) + g_k(x_k) w_k$$

$$z_k = h_k(x_k) + v_k \tag{14}$$

where the trajectory index and the time sampling index are both k, $f_k(.)$ and $h_k(.)$ are nonlinear time dependent operators, $g_k$ is a time-dependent gain, $v_k$ and $w_k$ are mutually independent zero-mean white gaussian processes with covariances $R_k$ and $Q_k$ respectively and $x_0 = N(\bar{x}_0, P_0)$.

The nonlinear model is linearized by use of a Taylor series expansion about $x = \hat{x}_{k|k}$, so that $$f_k(x_k) \cong f_k(\hat{x}_{k|k}) + F_k(x_k - \hat{x}_{k|k})$$

$$g_k(x_k) \cong g_k(\hat{x}_{k|k}) \equiv G_k \tag{15}$$

$$h_k(x_k) \cong h_k(\hat{x}_{k|k-1}) + H_k^T(x_k - \hat{x}_{k|k})$$

where $$F_k = \partial f_k(x_k)/\partial x |_{x=\hat{x}_{k|k}}$$

and $$H_k^T = \partial h_k(x)/\partial x |_{x=\hat{x}_{k|k-1}}.$$

Assuming that $\hat{x}_k$ and $\hat{x}_{k|k-1}$ are known, the resulting quasi-linear signal model equations may be written so that they are similar in form to the linear equations used previously, as follows:

$$x_{k+1} = F_k x_k + G_k w_k + \chi_k$$

$$z_k = H_k^T x_k + v_k + \eta_k \tag{16}$$

where $\chi_k$ and $\eta_k$ are available from estimates as $$\chi_k = f_k(\hat{x}_{k|k}) - F_k \hat{x}_{k|k}$$

$$\eta_k = h_k(\hat{x}_{k|k-1}) - H_k^T \hat{x}_{k|k-1} \tag{17}$$

The corresponding EKF equations are as follows:

$$\hat{x}_{k|k} = \hat{x}_{k|k-1} + L_k[z_k - h_k(\hat{x}_{k|k-1})]$$

$$\hat{x}_{k+1|k} = f_k(\hat{x}_{k|k})$$

$$L_k = S_{k|k-1} H_k \Omega_k^{-1}$$

$$W_k = H_k^T \Sigma_{k|k-1} H_k R_k \tag{18}$$

$$\Sigma_{k|k} = \Sigma_{k|k-1} - \Sigma_{k|k-1} H_k [H_k^T$$

$$\Sigma_{k|k-1} H_k + R_k]^{-1} H_k^T \Sigma_{k|k-1}$$

$$\Sigma_{k|k+1} = F_k \Sigma_{k|k} F_k^T + G_k Q_k G_k^T$$

where $$\Sigma_{0|-1} = P_0 = E\{(x_0 - \bar{x}_0)(x_0 - \bar{x}_0)^T\},$$

and $$\hat{x}_{0|-1} = \bar{x}_0.$$

FIG. 8 is a block diagram that shows the EKF equations (18). FIG. 8 is labeled so as to correspond to the variables and matrices of equations (18).

The prior art EKF technology must be selectively and judiciously applied. Otherwise, poor performance can result due to stability of numerical integration, stability of the filtering equations and numerical error build-up. The finite time increments used in difference equation approximations can require fine increments that begin to approach infinitesimal increments. Consequently, the additional computation resulting from these fine-increment difference equations can impose an unacceptable computational burden on the control system processor.

Jazwinski, (A. H. Jazwinski, Stochastic Processes and Filtering Theory, Academic Press, 1970) describe an Extended Kalman Filter for continuos-time system without exogenous inputs u(t). Equations (14) above are replaced by $$\dot{x} = f(x, t) + G(t) w$$

$$z = h(x, t) + v \tag{14a}$$

The filtering equations are identical to (18) except that the state estimate time propagation is performed by direct numerical integration given by $$\hat{x}(t_{k+1}|t_k) = \hat{x}(t_k|t_k) + \int_{t_k}^{t_{k+1}} f(\hat{x}(t|t_k), t) dt \tag{18a}$$

The use of direct numerical integration of the continuos-time nonlinear system presents several problems. Stability of the numerical integration, stability of the filtering equations and the computational load for real-time use are the main problems.

Instability of numerical integration arises from selection of step size in numerical integration to achieve feasible computational loads. Instability of the filter equations arise from mismatch between the linearized signal model used in the filter update and the implicit signal model in numerical integration. Typical physical models have widely different time scales leading to stiff differential equations (Reference: G. Golub and J. Ortega, Scientific Computing and Differential Equations, Academic Press, 1992). Prior methods using variable step solvers such as Gear's stiff method are used for such systems. Such variable step solvers impose highly variable data-dependent computational load. Highly variable computation load makes these methods inappropriate for real-time use. Fixed step methods such as Runge-Kutta or Euler require very small step size to ensure stability of numerical integration itself. Lack of numerical stability of integration leads to large errors. Numerical stability of the integration is not sufficient to provide stability of the real-time filter.

The present invention, by contrast, imposes fixed computation burden, permits time propagation in a single step that ensures numerical stability of integration as well as that of the filter. Stability of the filter in the present invention is arises from ensuring that 1) the time update for the state estimates and the covariance updates for the filtering equations use consistent time-varying linear system signal models; and 2) the time-varying linear signal model satisfies conditions for observability, controllability through disturbances and positivity of initial state error covariance matrix $P_0$.

In the present invention, these conditions are easily satisfied regardless of accuracy of the non-linear system equation (12), (19) with respect to the real system that generates signals used by the filter so that stability is preserved under large model errors. This property is useful in applications of CTEKF for adaptive processing, real-time system identification, hypothesis testing, fault detection and diagnosis where large model errors must be tolerated in real-time. Consequently, the resulting state estimates are stable and avoid the unstable consequences of prior-art EKF state estimation methods.

Prior-art formulation (14) and (14a) does not explicitly account for exogenous inputs u(t). In digitally controlled systems, exogenous inputs are typically outputs of zero-order-hold circuits. Exogenous inputs play a critical role in behavior of the controlled systems and have to be accurately represented in the model used in the filtering equations. Present invention addresses exogenous inputs explicitly. It also handles the digitally controlled exogenous inputs effectively.

A sensor processing method for the implementation of extended Kalman filter techniques for continuos-time nonlinear systems should provide the following features:

1) the use of numerical integration in the solution of continuous time nonlinear differential system equations in the state estimate time update that imposes low fixed, deterministic computation load;

2) covariance update and gain calculations that ensure stability of the combined state estimate update and the filter update in spite of mismatch between the system generating the signals and its assumed signal model in the filter;

3) the numerically stable square-root method for updating of the state vector covariance matrix should be used; and 4) reduced probability that minimization of the estimation error metric results in a local minimization rather than the desired global minimum.

SUMMARY OF THE INVENTION

A method for real-time nonlinear system state estimation in which the system is represented by a set of continuous-time nonlinear differential state equations that include a state vector representing the system states that are to be estimated, and a nonlinear system matrix that defines the functional relationship between the input vector, the state vector, and the time-derivative of the state vector. The state vector is estimated from a set of accessible measurements that are dependent on the state variables. The set of measurements, labeled as a measurement vector, are taken at prescribed times and represented by a measurement vector. Both the state vector and the measurement vector are respectively contaminated by a state noise vector and a measurement noise vector. The method includes the following steps:

(a) constructing a set of state equations representing the nonlinear system;

(b) establishing a set of state variable values for a current time state vector, and a set of matrix element values for one each covariance matrix for a current time state vector, for a current time state noise vector, and for a current time output measurement noise vector;

(c) acquiring a current time measurement vector;

(d) updating the state covariance matrices using the current time measurement covariance;

(e) estimating an updated current time state vector from the current time measurement vector by use of a state vector estimating filter that operates on the current time state vector using the current time measurement vector, the covariance matrices for the current time state vector, for the current time state, and for the current time measurement noise vector, the estimated updated state vector representing the state vector at the current measurement time;

(f) projecting the estimated updated state vector forward in time by integrating the system state equations over the prescribed time interval between the current prescribed measurement time and the next prescribed measurement time for obtaining a current state vector;

(g) projecting the updated state vector covariance matrix forward in time by using the results of the system equation integration of step (f); and (h) at the next measurement time iterate steps (c)–(g). Integration is performed by using matrix exponential in a single time step in a manner so that the signal models used by the filter state updates and the filter covariance updates are consistent.

Another embodiment includes the use of simulated annealing in the filter equations for reducing the probability of getting trapped in a local minimum of state estimation error metric rather than the global minimum.

Another embodiment includes the use of the above estimation techniques in closed-loop (feedback) control systems.

BRIEF DESCRIPTION OF THE DRAWINGS

The present invention will be more fully understood from the detailed referred embodiments of the invention, which, however, should not be taken to limit the invention to the specific embodiment but are for explanation and better understanding only.

DETAILED DESCRIPTION OF THE PRESENT INVENTION

Computer models of complex physical processes, such as those involving heat, mass, and reacting flows, form the basis for controlling these processes. Traditionally, every effort is made to greatly simplify the model by decoupling and dissociating various aspects of the physical process in order to reduce the number of interacting factors which may complicate estimation of the desired properties. As a result, estimates of system model parameters and states are made using quasi-static tests with the hope of isolating and measuring individual properties of interest, free from unknown effects of other processes and confounding due to memory effects of dynamic transients. The primary deficiency of this approach is that many individual and isolated experiments are needed.

High complexity and lack of predictive accuracy are often cited as problems in using realistic physical models in real-time control and process optimization. However, a controller based on an inaccurate model generally leads to a significant performance penalty. Simultaneous estimation of unknown constant parameters and unknown endogenous variables from measurements is required to improve the models. This problem, known as the system identification problem (Reference Ljung, System Identification, Theory for the User, Prentice Hall, 1987), is a special case of the estimation problem addressed by this invention.

Most methods and software tools based on modern control theory are limited to linear time-invariant models. Simulation models are used for obtaining local linear models for system synthesis and for closed-loop testing and verification of the controller design. The reliability and the complexity of the simulation model refinement and verification task is a major bottleneck in such efforts. Efficient refinement and verification of the system model in the presence of noisy sensor data, which involves nonlinear state estimation and system identification, can greatly reduce these efforts and permit better designs.

The method to be described for estimating nonlinear system states provides an accurate and stable method in the design, test, diagnosis and control phases of these nonlinear systems.

Figure 9:
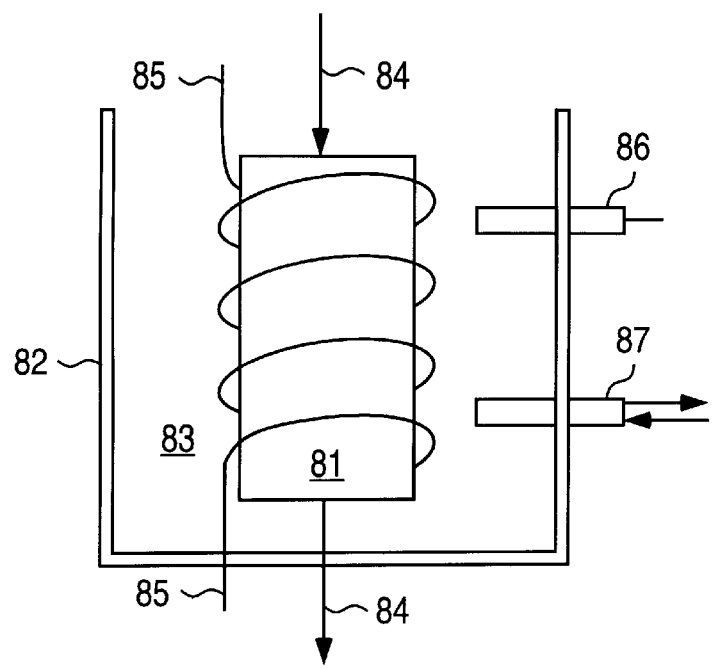
FIG. 9 shows an example of a nonlinear thermal kinetic process plant.
Figure 10:
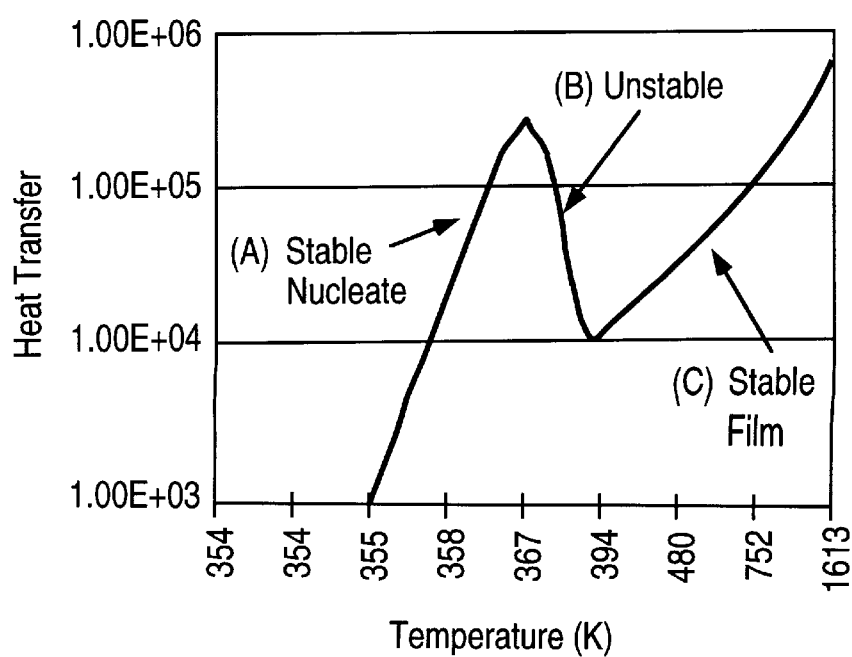
FIG. 10 shows a highly nonlinear heat transfer characteristic of a thermal kinetic system.

As an example of a non-linear system, consider the thermal kinetic system 80 shown in FIG. 9 in which a porous part 81, a carbon preform, is placed in a reactor filled with a reactant bearing carbon species 83 for deposition of carbon in the porous spaces of the preform. Preform 81 is heated resistively by current passing through the preform on conductive leads 84 (or by inductive radio frequency current passing through inductive heating coil 85). The surface temperature is sensed by a set of pyrometers 86. The density of the deposits are measured indirectly by means of Eddy current probes 87 that induce a high frequency electrical current in the preform which is monitored by the readout sensors of the Eddy current probes. The determination of the thermal behavior of a preform during the deposition process is critical because poor thermal control leads to uneven densification and poor part strength. In this regard, it is important to determine the nonlinear boiling curve that represents the heat transfer rate between the reactant and the preform. Typically, as the preform surface temperature increases the mechanism of heat transfer from the preform to the liquid reactant varies with the surface temperature as shown in the boiling curve of FIG. 10. Over the range of surface temperature shown, the boiling curve passes through three distinct modes known as the nucleate regime (A), the unstable transition regime (B), and the stable film regime (C). This is a highly nonlinear function of temperature in which an increase in temperature can cause a decrease in heat transfer rate due to the vapor film caused by boiling between the preform and the liquid reactant. The separation caused by the film requires a substantial increase in temperature in order to maintain a constant heat flux. The transition region is unstable because the associated eigenvalues are positive (stability is normally associated with the negative real part of the eigenvalue that imply exponentially damped response).

In this example, the state vector could include hundreds of surface and internal temperature points, the corresponding densities of the preform, reactant concentrations, and species concentration. Each surface element would therefore have an associated nonlinear boiling heat transfer with parameters that would vary with location and the physical configuration of the process shown in FIG. 9. Based on a given physical implementation and available empirical model data, a set of nonlinear continuous-time differential equations can be generated that describe the thermal kinetic system of FIG. 9. These equations are then used to form the model for the system as a basis for making refined estimates of the system state variables.

Figure 11:
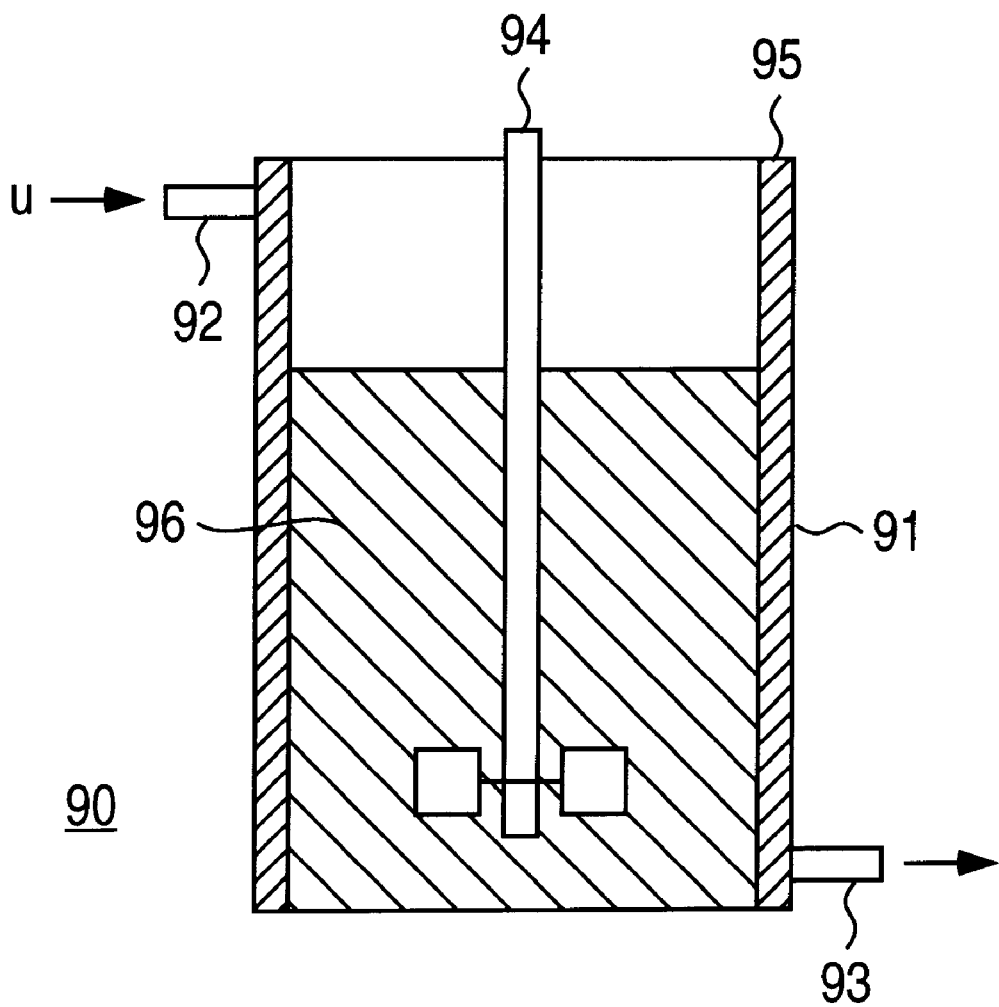
FIG. 11 is an example of a biochemical nonlinear batch processing system.

As another example, consider the cylindrical water-cooled batch bio-chemical reactor system 90 of FIG. 11 that is used in the manufacture of enzymes and drugs. Reactor 90 includes the reaction vessel 91 wherein the batch reaction takes place, input ports 92 and output ports 93, agitator mechanism 94, cooling manifold 95, and reaction chamber 96. The state variable vector x has elements $\{x_i\}$ that may typically include: cell concentration $x_1$, the substrate concentration $x_2$, final product concentration $x_3$, dissolved oxygen concentration $x_4$, temperature of the medium $x_5$, and the pH value of the medium $x_6$. These state vector elements may be prescribed for various radial and axial locations in the reactor. The real-time measurement vector z has elements $\{z_i\}$ that typically may include measurements at various locations in the reactor chamber of dissolved oxygen concentration $z_1$, temperature of the medium $z_2$, and pH of the medium $z_3$. Input vector u has elements $\{u_i\}$ that may include measured inputs such as: cell concentration $u_1$, feed stream flow rate $u_2$, effluent stream flow rate $u_3$, and cooling flow rate $u_4$. The rates of the nonlinear bio-chemical process can be described by the so-called Michaelis-Menten kinetics or by more detailed structured nonlinear kinetics equations. The heat transfer and mass transfer is described using standard chemical engineering calculations (Reference:

Bailey and Ollis, Biochemical Engineering Fundamentals, 2$^{nd}$ edition, McGraw Hill, 1987).

While it is possible to draw samples from the batch reactor during progress of the reaction for measuring of cell-mass concentration, substrate concentration, and the final product concentration, it is not practical or cost-effective to do so on-line in real-time. By using a continuous-time extended Kalman filter (CTEKF) to estimate all state variables in real-time, CTEKF can provide a cost-effective means for monitoring and controlling the reaction. All input vector elements (e.g. flow rates of feed streams and effluents, and the cooling flow) can be controlled based on the real-time estimates of the state variables. The CTEKF method can provide real-time state variable estimates that are comparable to those obtained by expensive off-line (non-real-time) analytical instruments.

The present invention is designed to overcome the prior-art deficiencies and problems in estimating states of nonlinear systems. The method, a continuous-time extended Kalman filter (CTEKF) for state estimation, is an extended Kalman filter (EKF) for continuous-time nonlinear systems using discrete time measurements and integration.

The present invention, by contrast, imposes fixed computation burden, permits time propagation in a single step that ensures numerical stability of integration as well as that of the filter. Stability of the filter in the present invention is arises from ensuring that 1) the time update for the state estimates and the covariance updates for the filtering equations use consistent time-varying linear system signal models; and
2) the time-varying linear signal model satisfies conditions for observability, controllability through disturbances and positivity of initial state error covariance matrix $P_0$.

In the present invention, these conditions are easily satisfied regardless of accuracy of the non-linear system equation (19), given below, with respect to the real system that generates signals used by the filter so that stability is preserved under large model errors. Consequently, the resulting state estimates are stable and avoid the unstable consequences of prior-art EKF state estimation methods.

Figure 12:
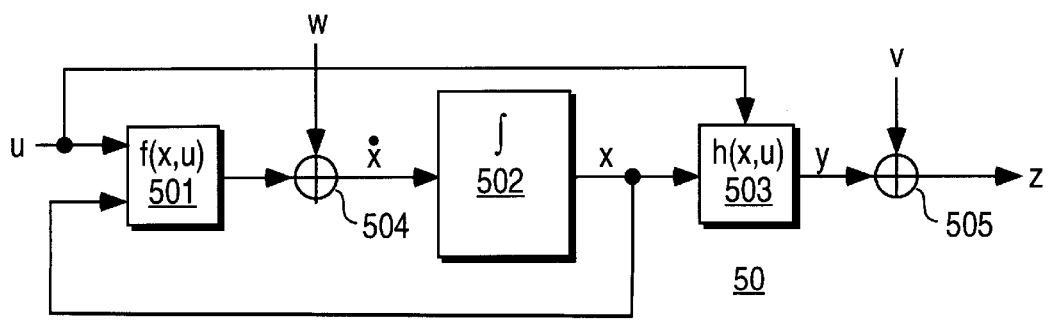
FIG. 12 is a block circuit diagram for a nonlinear system with exogenous inputs.

FIG. 12 is a general model for a nonlinear system representative of the type of system to which the CTEKF method can be applied. The equations describing the nonlinear system model are $$\dot{x} = f(x, u) + w$$
$$z = h(x, u) + v \qquad (19)$$

where x is the state vector, u the input vector, z the measurement vector, f(x,u) and h(x,u) are nonlinear function of x and u, and w and v are mutually independent white noise vectors with respective covariances R and Q.

Figure 7:
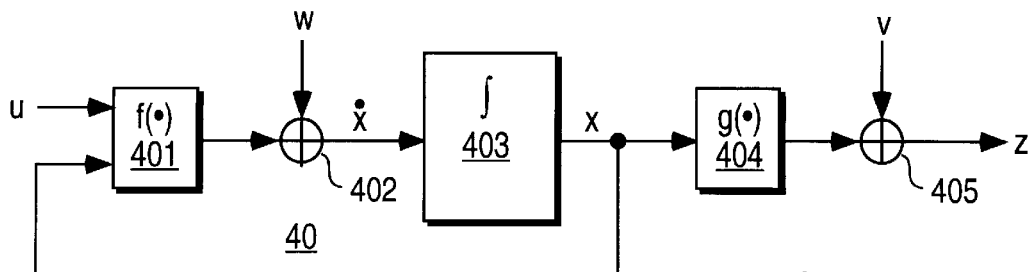
FIG. 7 is a block diagram of a state variable nonlinear continuous-time physical plant model.
Figure 8:
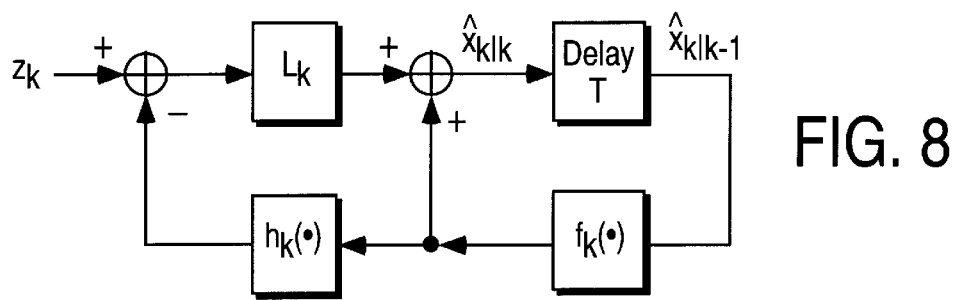
FIG. 8 is a discrete-time extended Kalman filter for use in estimating state variables in a nonlinear continuous-time physical plant as in FIG. 7.

A common approach, as previously described with reference to FIG. 7, is to linearize and discretize the nonlinear model of eqs. (19) and FIG. 12 along a nominal trajectory resulting in sequence of linear signal models characterized by eqs. (13)–(17). The linearized EKF filter is given by eqs. (18). This approach can lead to degraded, unstable, performance due to deviations from the nominal trajectory.

To overcome the degraded and unstable performance of the prior-art EKF filter methods, in the CTEKF method, the EKF method is combined with numerical integration in order to overcome the problems experienced with the prior-art EKF methods when applied to continuous-time nonlinear system estimation. The CTEKF method may be summarized as follows:

1) the CTEKF gain and the covariances are computed using the discrete-time system model matrices and the recent measurement;
2) the state vector estimate is updated using the measurement vector;
3) the continuous-time signal model equations are linearized at the current estimated state vector element values;
4) the coefficient matrices obtained from step (3) are used to obtain a discrete-time system model using a matrix exponential;
5) the nonlinear differential system equations are integrated to obtain the next state vector using the matrix exponential;
6) the covariance matrix is updated for time update using results from (4).

For added numerical reliability, the "square-root" approach to implementing the Kalman filter is used. The square-root implementation guaranties non-negativity of the propagated covariance matrices.

Referring back to FIG. 12, vector integrator 502 integrates vector $\dot{x}$ and produces state vector x at the output. The state vector x in combination with input vector u is operated-on by nonlinear vector input network 501 and produces a nonlinear output vector function, f(x,u) to which white noise vector is added for producing the noisy state vector time derivative. The output, x, of integrator 502, and the input vector, u, are supplied to nonlinear vector network 503 to provide a noise free measurement vector, y, that is added to noise vector v to produce the available measurement vector z.

The procedure for linearizing the signal model of FIG. 12 and eqs. (19) may be best understood by referring to the signal-time model of FIG. 13 in which waveform (a) represents a series, $\{u_k^m\}$, of constant values of T duration each of the m$^{th}$ element u$^m$(t), at the k$^{th}$ sampling time. Waveform (b) represents the x$^m$(t), of the state vector x. Waveform (c) represents the z$^m$(t), of measurement vector z (not necessarily corresponding to x$^m$). Waveform (d) indicates the time-interval within each sample-interval, T, during which a conditional estimated state vector update, $\hat{x}_{k+1|k}$, is made during the k$^{th}$ step.

At the beginning of the k$^{th}$ step, the values $\hat{x}_{k|k-1}$, $u_k$, and $z_k$, and matrices $S_{k|k-1}$, $Q_k$, $R_k$, and $C_{k-1}$ are known. $S_{k|k-1}$, $Q_k$, and $R_k$ are, respectively, the square-root state vector covariance matrix ($\Sigma = SS^T$), the input noise (w) covariance vector, and the measurement noise (v) covariance vector, as previously defined. $C_{k-1}$ is the linearized output matrix from the previous step.

Using saved values of matrices, a measurement update is made by use of the following QR factorization (Golub, G. H., Van Loan, C. F., "Matrix Computations", Johns Hopkins Univ. Press, Baltimore, Md., 1983, 147–153):

$$\begin{bmatrix} R_{in}^T & K_k^T \\ 0 & S_{k|k}^T \end{bmatrix} = Q \begin{bmatrix} R_k^{T/2} & 0 \\ S_{k|k-1}^T C_{k-1}^T & S_{k|k-1}^T \end{bmatrix} \qquad (20)$$

where Q is the QR transformation matrix that is applied to the partitioned matrix shown on the right for producing the upper triangular matrix on the left that contains the required Kalman filter gain, $K_k$, and the updated square-root conditional covariance $S_{k|k}$, and T is a matrix transpose operator. State vector $\hat{x}_{k|k-1}$ is updated using the following relationship:

$$\hat{x}_{k|k} = \hat{x}_{k|k-1} + K_k R_{in}^{-1}(z_k - h(\hat{x}_{k|k-1}, u_k)) \qquad (21)$$

In an alternative embodiment, the output equation for z in eqs. (19) is linearized at $\hat{x}_{k|k-1}$, $u_k$ obtain $C_k$ for use in the place of $C_{k-1}$ in eq. (20). It should be noted that only the transformed matrix of eq. (20) needs to be saved; the transformation matrix Q does not have to be explicitly created or stored. This results in significant savings of storage space and computational burden. Also, the solution of the system of linear equations (eq. (21)) involving $R_{in}$ is simplified because $R_{in}$ is in upper triangular form as a result of the QR transformation and $R_{in}^{-1}$ can be obtained by the well known "back-solve" method. The Householder method for QR factorization is a preferred method because it can be applied in place to the R matrix (Golub and Van Loan, op. cit, 40–41).

Also, because the measurement update (eqs. (20, 21)) and the time update are separate and distinct steps, it is possible to accommodate the omission of a measurement update if the measurement vector data is not available, or if the measurement vector data is grossly unreliable. Consequently, this provides a method for state vector estimation that accommodates measurement sensors with different rates of observation and also provides a robust state vector estimation method that would provide for a graceful (incrementally) degraded performance due to failures causing a lack of measurement observations. In other words, upon lack of measurement data, simply set $$\hat{x}_{k|k} = \hat{x}_{k|k-1}$$

$$S_{k|k} = S_{k|k-1} \quad (22)$$

and proceed to the next step.

Figure 14:
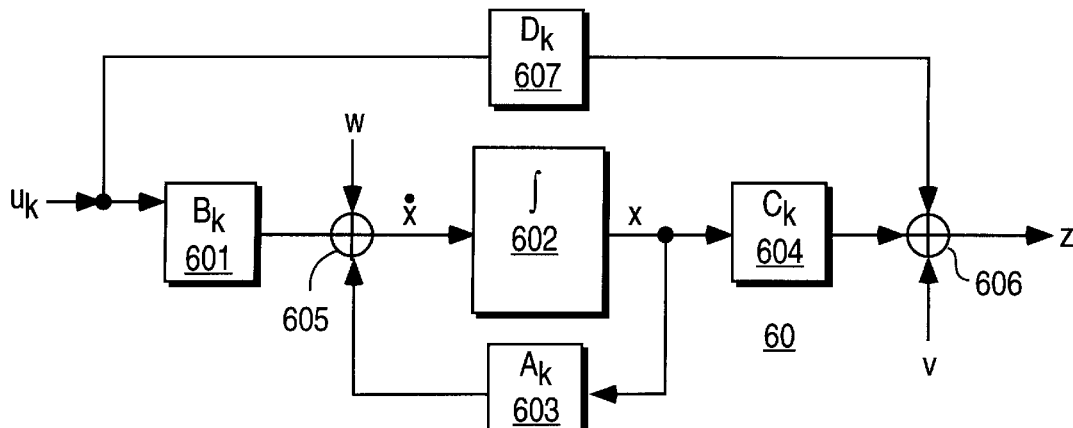
FIG. 14 is a block diagram of a CTEKF continuous-time linearized model.

The linearized signal model equations take on the following form:

$$\dot{x} = A_k x + B_k u$$

$$z_k = C_k x + D_k u, \text{ for } k=1,2, \quad (23)$$

where k is the time index, as previously defined. FIG. 14 is a block diagram representation of the linearized signal model.

Equations (19) are linearized at the values of the vector elements corresponding to the conditional estimated state vector $\hat{x}_{k|k}$ and input vector $u_k$ as shown in FIG. 14. The matrix $A_k$ is constructed by perturbing the elements of the state vector $x_k$ by a small amount, $\delta(x_k)$, that correspond to each column i, for obtaining a column of coefficients approximating the partial derivative of the $i^{th}$ column (vector), $A_k^{(i)}$, with respect to the $i^{th}$ element, $x_k^{(i)}$, of state vector $x_k$. Thus, from eqs. (19), $$A_k^{(i)} = [f(x_+, u_k) - f(x_-, u_k)]/\delta(x_k^{(i)})$$

where $$x_\pm = \hat{x}_{k|k} \pm \delta(x_k^{(i)})/2 \quad (24)$$

Similarly, the columns of vectors $B_k, C_k$, and $D_k$ are obtained as follows:

$$B_k^{(i)} = [f(x, u_+) - f(x, u_-)]/\delta(u_k^{(i)})$$

$$C_k^{(i)} = [h(x_+, u) - h(x_-, u)]/\delta(x_k^{(i)})$$

$$D_k^{(i)} = [h(x, u_+) - h(x, u_-)]/\delta(u_k^{(i)}) \quad (25)$$

where $$u_\pm = u_k \pm \delta(u_k^{(i)})/2$$

The perturbation $\delta(.)$ is a sufficiently small deviation so that the local gain is well approximated by the approximate partial derivatives $A_k^{(i)}, B_k^{(i)}, C_k^{(i)}$, and $D_k^{(i)}$. When this procedure is applied to each column of matrices $A_k, B_k, C_k$, and $D_k$, the gain matrices of FIG. 14 are defined for the interval corresponding to step k.

Figure 13:
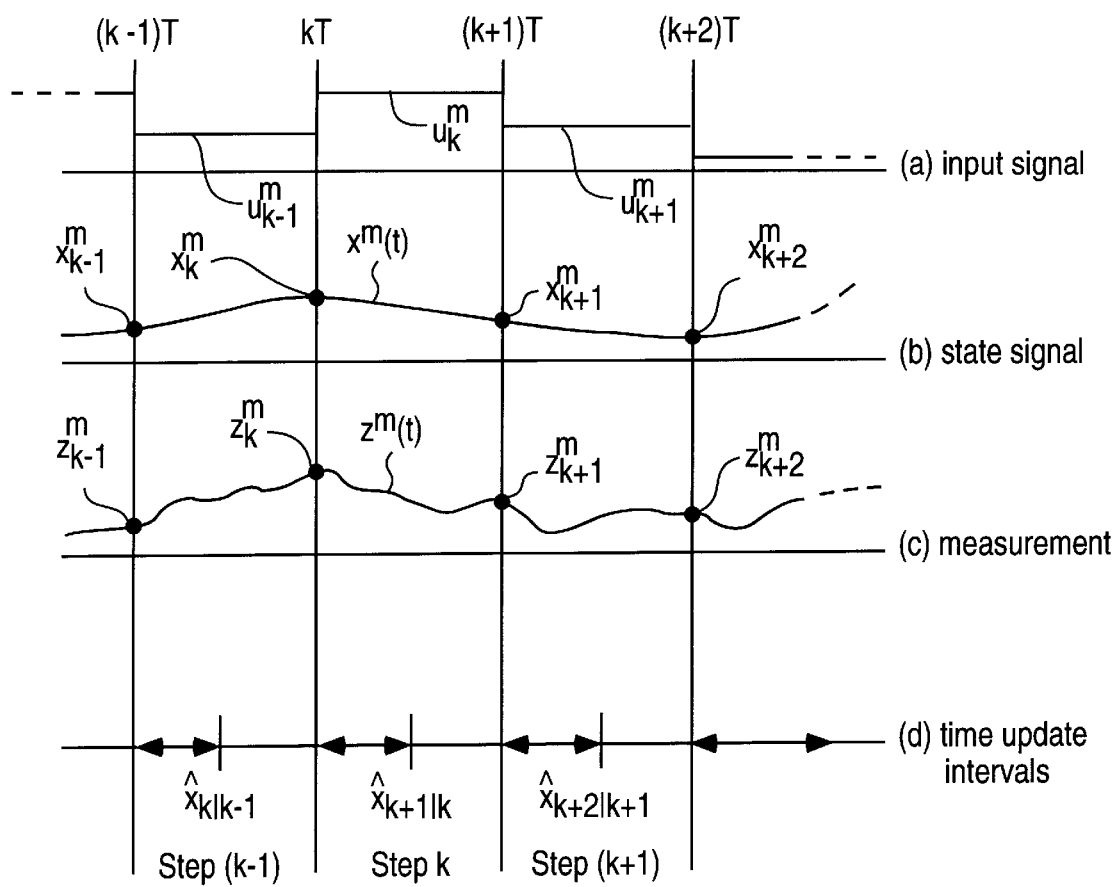
FIG. 13 shows the waveforms and timing of the CTEKF.

The next step in the time update procedure involves integrating the nonlinear equations (26) to obtain $\hat{x}_{k+1|k}$ by using $\hat{x}_{k|k}$ as the initial condition and $u_k$ as the constant input signal over the duration of the $k^{th}$ step as shown in waveform (a) of FIG. 13.

The simplest method for implementing numerical integration of $$\dot{x} = f(x, u) \quad (26)$$

over the $k^{th}$ step interval is by the use of Euler's integration algorithm, i.e.

$$\hat{x}(t_k + h|t_k) = hf(\hat{x}(t_k|t_k), u_k) + \hat{x}(t_k|t_k),$$

$$\hat{x}(t_k|t_k) = x_{k|k}$$

and $$\hat{x}(t_k + T|t_k) = \hat{x}_{k+1|k} \quad (27)$$

where h is the selected integration step size and $\hat{x}_{k|k}$ is the initial value. Unfortunately, for stiff systems, very small step sizes (h<<T) may be needed in order to have the finite difference equation (27) acceptably approximate integration. This could result in an unacceptable computational burden.

A further consideration is that a mismatch between $F_k$ used in the filter covariance propagation and the effective $F_k$ used in the simulation time update can cause stability problems in the resulting time-varying Kalman filter. This is because the Euler's approximate integration in eq. (27) is not the same as the matrix exponential used in computing $F_k$ covariance update in eq. (33) shown below.

Because it is highly desirable to avoid the mismatch in the transition matrix, $F_k$, used in the covariance propagation and the effective transition matrix used in the state variable time update, and to also avoid the computational burden imposed by the use of Euler's approximate integration method, the following development shows how the matrix exponential can be used for both operations.

To propagate state estimates in time, i.e. $\dot{\hat{x}}(t) = f(\hat{x}(t), u(t))$, and $\hat{x}(kT) = \hat{x}_{k|k}$, a locally linear model is used as follows:

$$\frac{d}{dt}(\delta \hat{x}(t)) = A_k \delta \hat{x}(t) + f(\hat{x}_{k|k}, u_k) \quad (28)$$

$$\frac{\partial f}{\partial \hat{x}} I_{\hat{x}_{k|k}} = A_k$$

Exact integration of (28) leads to equation (29) below.

$$\hat{x}(kT + \tau) = \hat{x}(kT) + \int_{\lambda=0}^{\tau} e^{A_k(\tau - \lambda)} f(\hat{x}_{k|k}, u_k) d\lambda \quad (29)$$

By letting $f_k = f(\hat{x}_{k|k}, u_k)$, eq. (29) becomes $$\hat{x}((k+1)T) = \hat{x}(kT) + \int_{s=0}^{T} e^{A_k(T-s)} f_k ds \quad (30)$$

The integral expression may be readily evaluated by using the following matrix relationship:

$$e^{\begin{bmatrix} A_k & f_k \\ 0 & 0 \end{bmatrix} T} = \begin{bmatrix} e^{A_k T} & \int_0^T e^{A_k(T-s)} f_k \, ds \\ 0 & I \end{bmatrix} = \begin{bmatrix} F_k & G_k \\ 0 & I \end{bmatrix} \quad (31)$$

where I is the identity matrix. Equation (31) allows the integral of equation (30) to be evaluated by exponential of the zero-augmented matrix on the left that contains state feedback matrix $A_k$ and vector $f_k$. It should be noted that the matrix exponential in accordance with eq. (31) not only evaluates the integral but also provides the exponentiation of $A_k$ as well.

Also note that the same matrix, $A_k$, appears in the evaluation of the integral. Therefore, the time propagation eqs. (31), (32) use linear discrete-time time-varying signal models consistent with the ones used in the covariance update eq. (20) and below in eq. (33). For example, if the expression for z in eqs. (19) is linear, the signal models are identical. Consequently, stability of the Kalman filter procedure is readily ensured even if the linear discrete-time time-varying signal model is totally inaccurate with respect to the original continuous-time nonlinear system as long as the linear signal model satisfies observability, controllability through disturbances and positivity of the initial covariance. The conditions of observability, controllability through disturbances and positivity is easy to satisfy through proper choice of noise covariances and selection of sensor signals. Also, unlike the Euler or other integration methods (explicit Runge-Kutta) the matrix exponential update method safely "residualizes" fast-states in a stiff system.

Care must be taken in the computation of the matrix exponential $e^{AT}$. The blind use of series expansion can lead to estimation instabilities. In one preferred embodiment, the method involves squaring and scaling is used to ensure numerically reliable results (Petkov, Christov and Konstantinov, Computational Methods for Linear Control Systems, Prentice Hall, 1991).

The updated conditional state vector, $\hat{x}_{k+1|k}$, can now be obtained by $$\hat{x}_{k+1|k} = \hat{x}_{k|k} + G_k \quad (32)$$

where $\hat{x}_{k|k}$ is defined by eq. (21).

The square-root of the state covariance vector, $S_{k|k}$, is now updated by using another QR factorization:

$$\begin{bmatrix} S_{k+1|k}^T \\ 0 \end{bmatrix} = Q \begin{bmatrix} S_{k|k}^T F_k \\ Q_k^{T/2} \end{bmatrix} \quad (33)$$

Again, the transformation can be performed in place because only the transformed matrix on the left needs to be retained.

Figure 15:
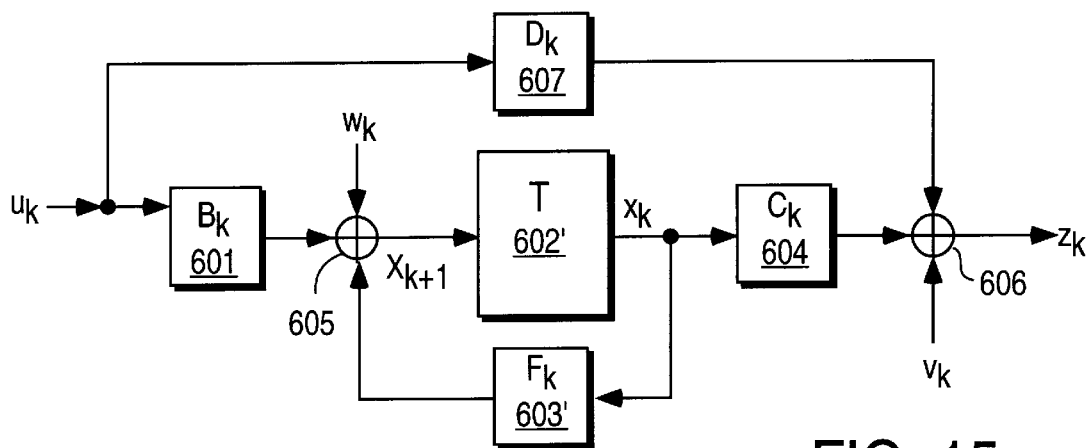
FIG. 15 is a block diagram of a CTEKF discretized-time and linearized model.
Figure 16:
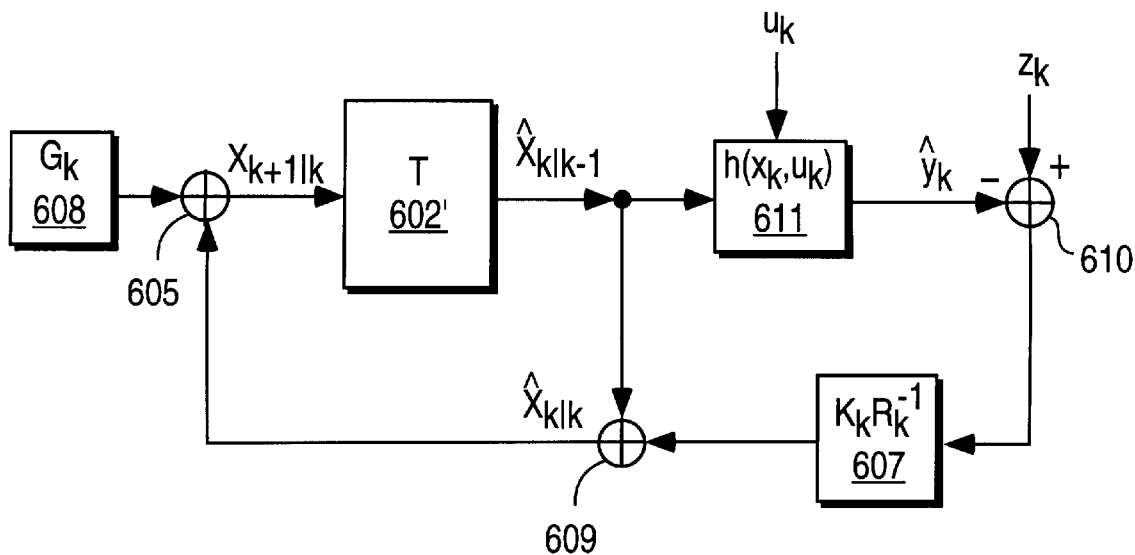
FIG. 16 is a block diagram of a CTEKF.

FIG. 16 is a block diagram representation of the CTEKF. The block elements have indicia that are identical to the indicia used in FIG. 15 for those items that are the same. Block element 608 is vector $G_k$ computed in equation (31). Block element 611 is the nonlinear vector function h(x,u) that maps states and exogenous inputs to output as in equation (19). Block elements 607–610 differ from those of FIG. 15. Element 610 is a unit for taking the difference between the estimated measured output and the actual measured output, $(z_k - \hat{z}_k)$ as implied in eq. (21), which is fed to element 607, a matrix gain unit based on values generated by means of eq. (20). The output of element 607 is applied to vector adder 609. The second input to 609 is provided by the output of delay unit 602' for providing $\hat{x}_{k|k}$ at the output of adder 609. The output of adder 609 is combined with $G_k$ by adder 605 to produce $x_{k+1}$ as the input to delay unit 602'.

Figure 17:
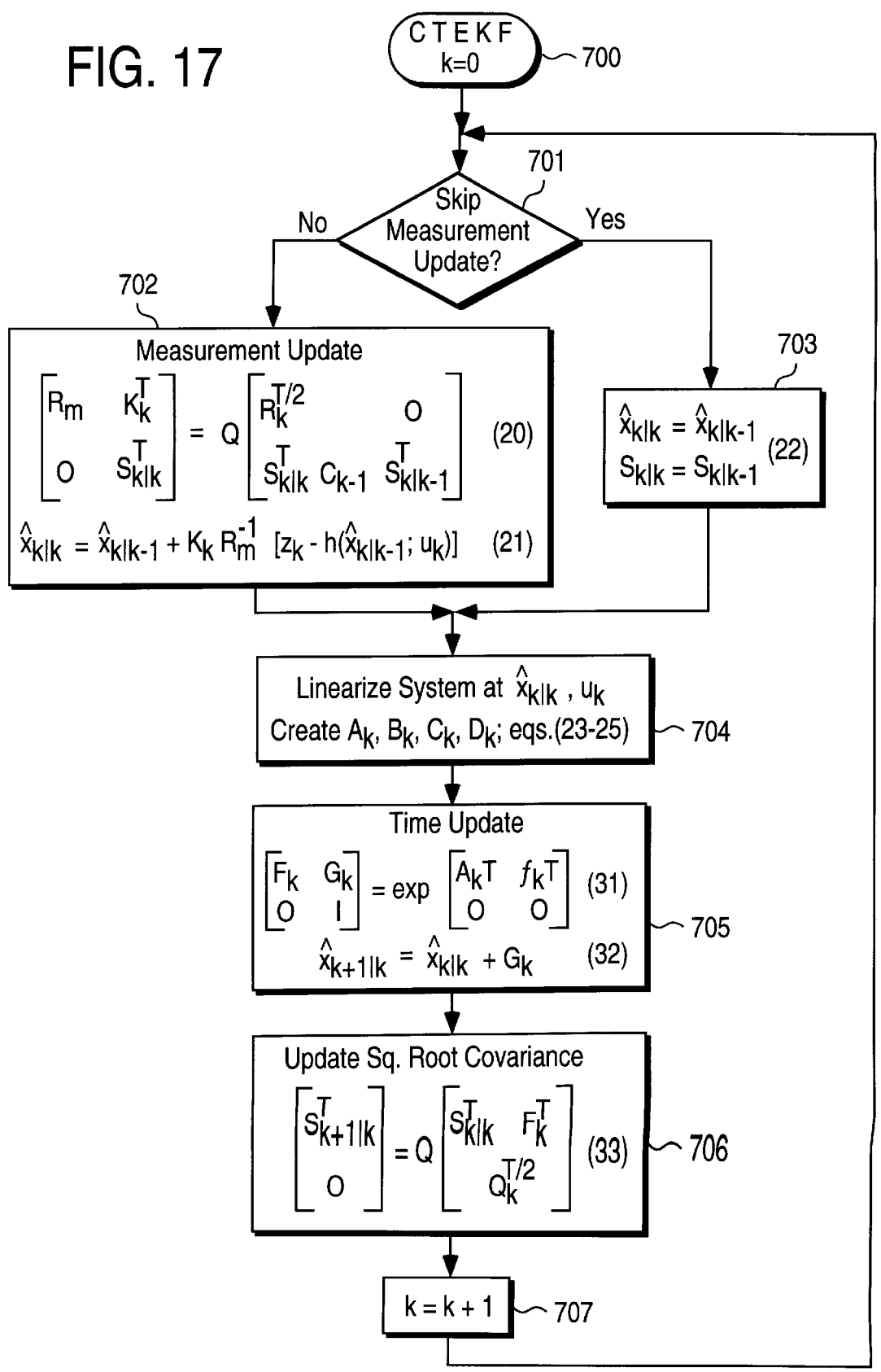
FIG. 17 is a flow diagram of the CTEKF method.

FIG. 17 is a flow diagram of method CTEKF 700 that summarizes the method for implementing a CTEKF for estimating the state variables of a nonlinear system of the type shown in FIG. 9. The method begins at step 700 with a set of initial values: $\hat{x}_{0|-1}, u_0, z_0, C_{-1}, S_{0|-1}$, and $R_0$ that have been defined previously. The iteration index k is set at k=0. At step 701, a determination is made if a measurement update is to be made, and, if so, the process goes to step 702 where a measurement update is made using QR factorization in accordance with eqs. (20) and (21). Otherwise step 703 is invoked in which the previous values $\hat{x}_{k|k-1}$ and $S_{k|k-1}$ are used as the new measurement updated values. At step 704, a model is created that is linearized about $(\hat{x}_{k|k}, u_k)$ and matrices $A_k, B_k, C_k$, and $D_k$ are computed in accordance with eqs. (23)–(25). At Step 705 time update using matrix exponential is carried out in accordance with eqs. (31) and (32). Steps 704 and 705 are followed by a time update in step 706 in which the state error covariance update is carried out using a square-root state vector covariance matrix as in eq. (33). Index k is incremented in step 707 and the process returns to step 701.

One difficult problem often encountered in nonlinear recursive state and parameter estimation or parameter tracking is getting stuck in a local minimum that may be far away from the desired optimum global minimum. One method for handling this problem is to make multiple estimates with each estimate initiated with a random perturbation. Simulated annealing is a related method that uses sequences of random perturbations with programmed gain (temperature) schedule that allows estimates to escape local minima. For example, see Rutenbar, R. A., "Simulated Annealing Algorithms: An Overview", IEEE Circuits and Devices Mag., pp. 19–26, January 1989.

Figure 18:
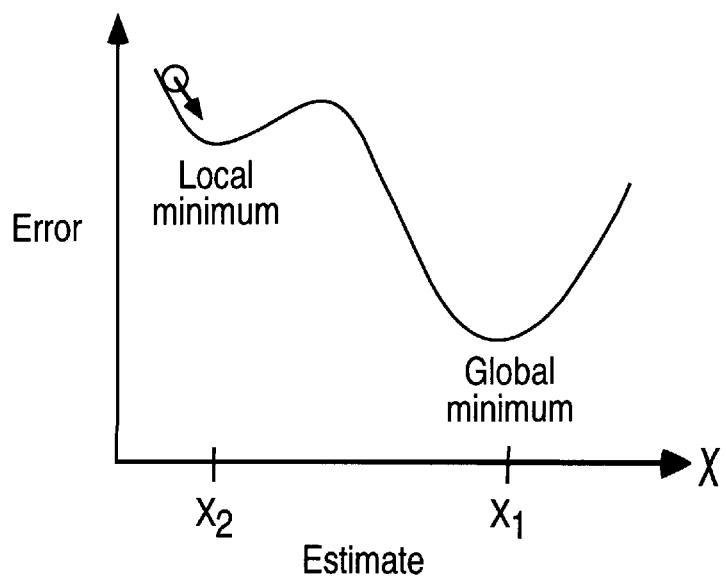
FIG. 18 shows an example of a local and global minimum.

FIG. 18 is a one dimensional example of the principle involved in simulated annealing in which the estimation error cost function is plotted as function of the value of the single state variable x. In seeking the global minimum at $x=x_1$, there is a chance that the local minimum at $x=x_2$ will be selected by the Kalman filter. Because the estimated solution is "dithered" by system and measurement noise about the minimum selected, there is a chance that a noise perturbation will cause an estimate to "jump" out of a local minimum at $x=x_2$ into the valley of the global minimum at $x=x_1$ if the noise perturbation is sufficiently large. Simulations of nonlinear systems with local minimums have shown increased covariance $Q_k$ of the system noise w and/or increased covariance of the initial state vector, $P_o$, permit convergence to the global minimum when the Kalman filter is started at a local minimum even when the assumed system signal model does not accurately represent the true system signal model.

In the context of nonlinear recursive state estimation, the process noise covariance Q may be controlled by applying a gain multiplier and a larger initial value which is decreased as a function of time. Also, the initial state vector covariance estimate, $P_o$, may be increased by a large factor. The increase in either initial covariance allows a greater initial correction of the state vector estimate than the theoretical stochastically optimal value. However, the Kalman filter Riccati equation update ensures overall stability while permitting more diffusion noise to enter the Kalman filtering equations.

A typical time varying "temperature schedule" gain multiplier has the following form:

$$\xi_k = \xi(kT) = \sqrt{\frac{2c}{\ln(2+kT)}} \quad (34)$$

$$Q_k = Q_0(1+\xi_k) \quad (35)$$

where c is a constant (typically 0.5<c<1), $Q_0$ is a positive definite symmetric matrix corresponding to the initial process noise covariance matrix, $Q_k$ is the process noise covariance matrix at time kT, and ln(.) is the natural logarithm.

We define an error metric as the scalar $$c_k = \text{trace}(S_{k|k} S_{k|k}^T) \quad (36)$$

where $S_{k|k}$ is defined in equation (20).

A multi-path simulated annealing algorithm is used that includes the following steps:

(i) choose N, the number of parallel CTEKF paths, typically between 4 and 10;

(ii) compute a temperature schedule and the corresponding process noise covariance matrices according to eqs. (34) and (35);

(iii) initialize each of the N CTEKF state estimates using random initial state vectors in some region;

(iv) update the N CTEKF according to eqs. (20)–(25), and (31)–(33);

(v) compute the scalar value $c_k = \text{trace}(S_{k|k} S_{k|k}^T)$ for each CTEKF and choose the estimate corresponding to the smallest $c_k = \text{trace}(S_{k|k} S_{k|k}^T)$ as the best estimate and output it as required; and (vi) identify the CTEKF with the highest value of $c_k = \text{trace}(S_{k|k} S_{k|k}^T)$ and add to its state estimate a random vector of variance equal to $c_k$; increment k the iteration index.

An alternative embodiment skips addition of a random vector in step (vi) above for every m steps (typically m=100).

Figure 19:
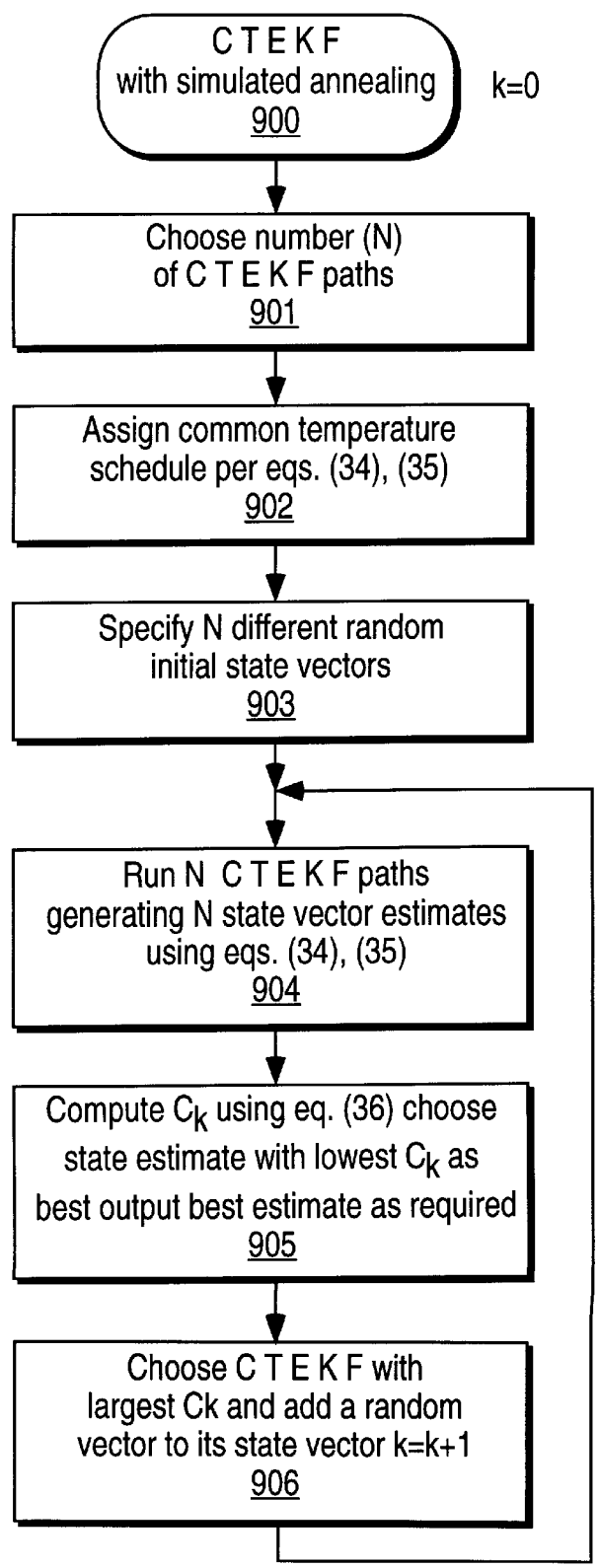
FIG. 19 is a flow diagram for using simulated annealing with the CTEKF method.

FIG. 19 is a flow diagram of a simulated annealing procedure (900) adapted to the CTEKF method. The procedure begins at step 901 in which the number of independent simulated annealing procedures, N, using the CTEKF method is specified. In step 902, a common gain schedule, {ξ(kT)}, and process noise covariance is specified as in eqs. (34) and (35). In step 903, N different randomized initial state vectors, one for each CTEKF path, are specified. Step 904 involves running N CTEKFs (paths) initialized in step 903 with each CTEKF operating on the same set of input and measurement observations for yielding N separate state variable vector estimates and covariance matrices at each sampling interval of T. In step 905, compute the scalar value $c_k = \text{trace}(S_{k|k} S_{k|k}^T)$ for each CTEKF and choose the estimate corresponding to the smallest $c_k = \text{trace}(S_{k|k} S_{k|k}^T)$ as the best estimate and output it as required. In step 906, identify the CTEKF with the highest value of $c_k = \text{trace}(S_{k|k} S_{k|k}^T)$ and add to its state estimate a random vector of variance equal to $c_k$. Increment k the iteration index. The process is iterated by returning to step 904.

Figure 1:
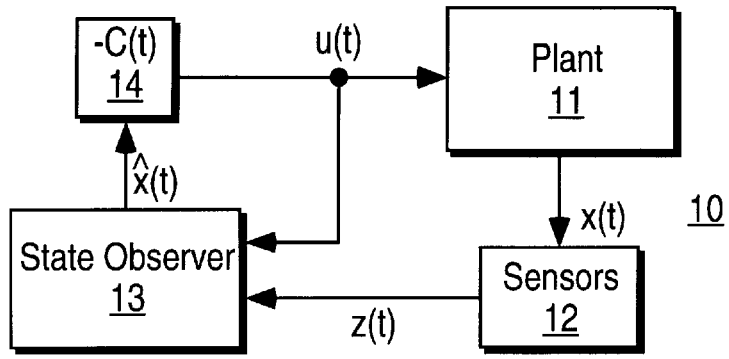
FIG. 1 shows a basic state variable control system using an observer for state variable estimation.
Figure 2:
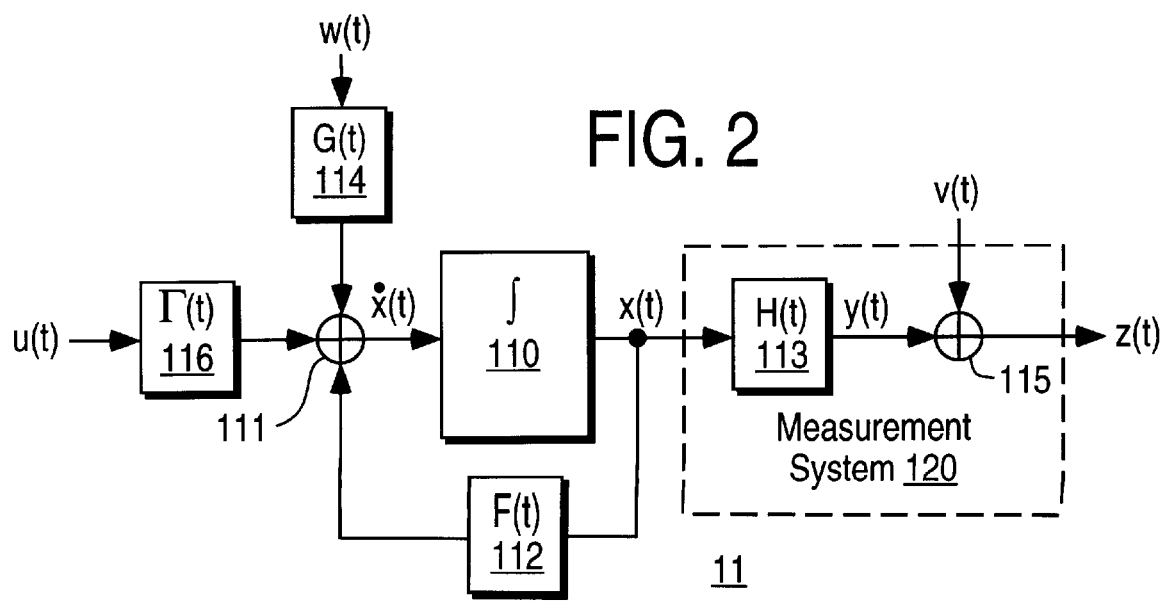
FIG. 2 is a state variable signal model for a physical plant.
Figure 3:
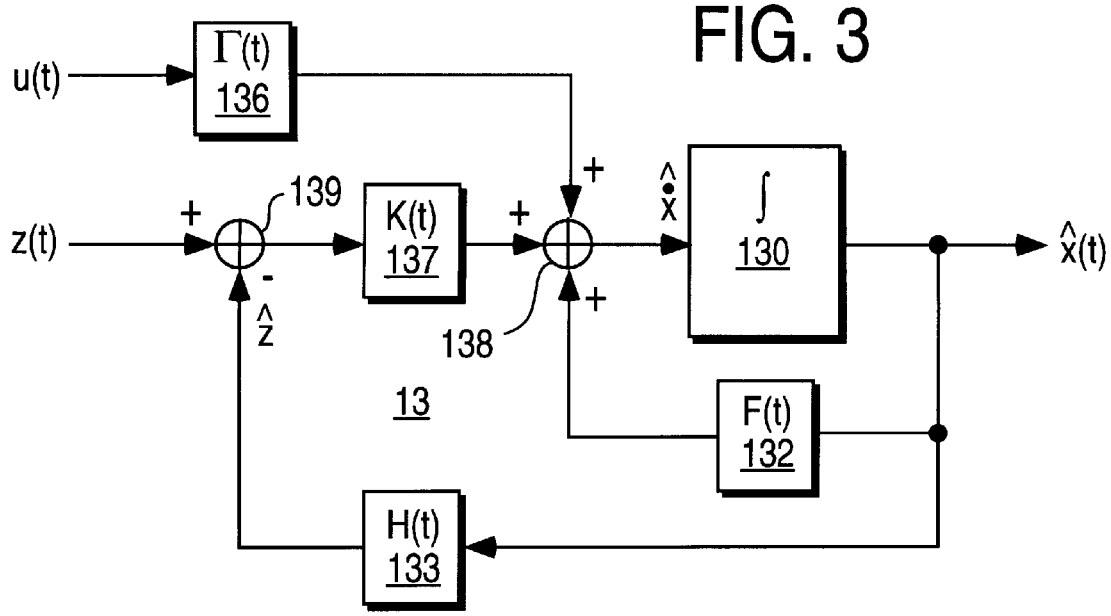
FIG. 3 is a Kalman filter implementation for estimating the state variables of the physical plant model shown in FIG. 2.
Figure 4:
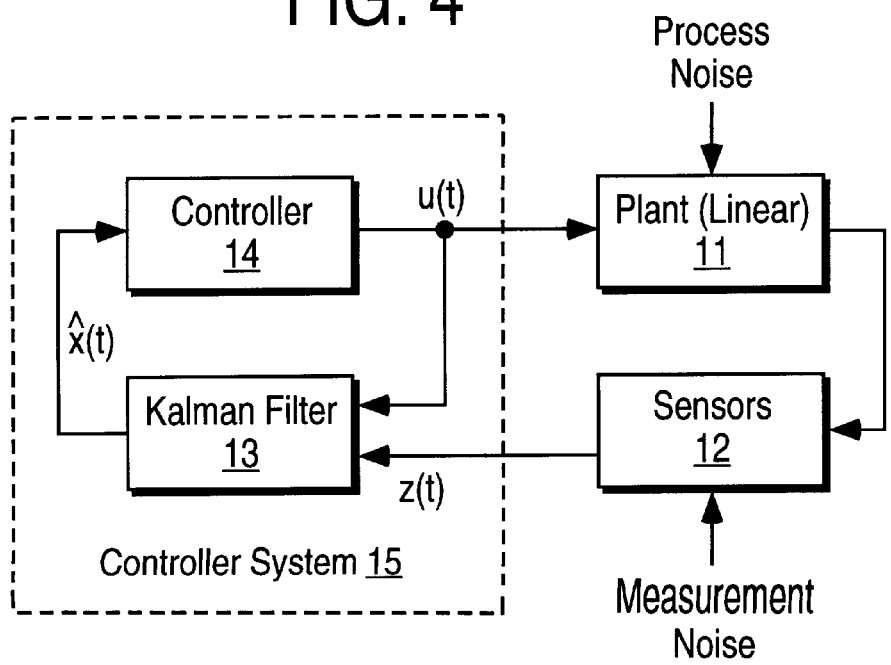
FIG. 4 is a block diagram of a state variable control system using a Kalman filter as a state observer.
Figure 5:
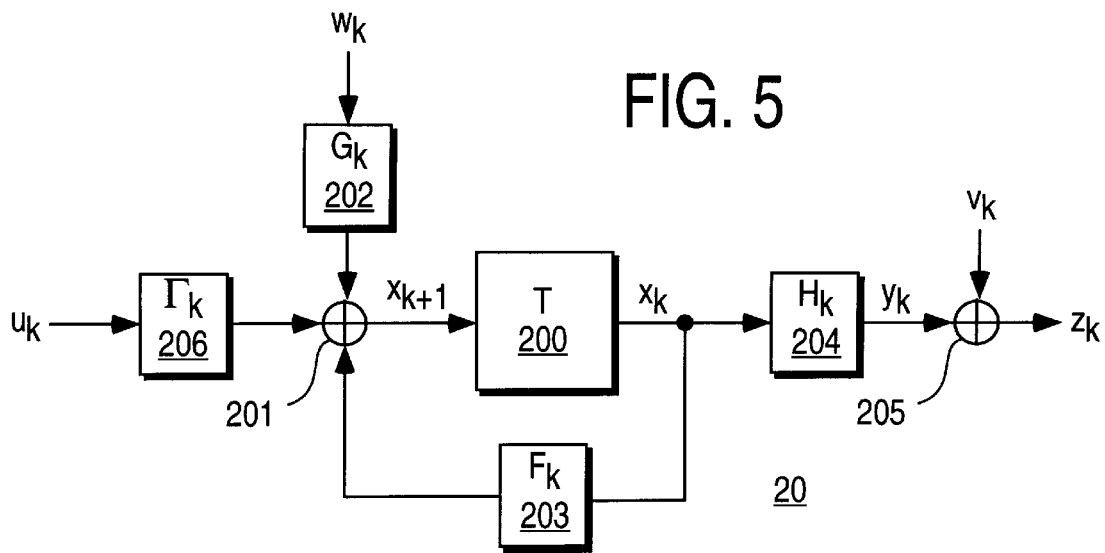
FIG. 5 is a discrete-time plant signal model.
Figure 6:
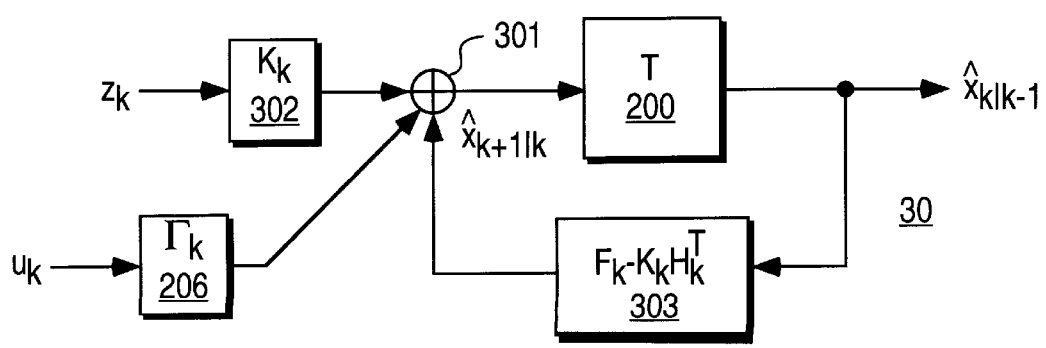
FIG. 6 is a block diagram of a discrete-time Kalman filter suitable for estimating the state variables of the plant model shown in FIG. 5.

A control system using CTEKF can be implemented as shown in FIG. 1 where sensor unit 12 corresponds to the measurement system producing measurement vector z(t), state observer 13 corresponds to the CTEKF system described above and in FIGS. 13–17, and controller unit 14 is implemented by well known optimal control methods that optimize a performance index and use the Certainty Equivalence Principle (Bryson and Ho, op. cit.). The Certainty Equivalence Principle permits use of the estimated state in place of measured states in an optimal control solution.

As will be understood by those skilled in the art, many changes in the methods described above may be made by the skilled practitioner without departing from the spirit and scope of the invention, which should be limited only as set forward in the claims which follow.

What is claimed is:

1. A method for estimation of state variables of a physical nonlinear system with physical exogenous inputs that can be modeled by a set of continuous-time nonlinear differential equations, including input signals representing the physical exogenous inputs to the system, and measurement signals representing accessible measurements that are indicative of the state variables to be estimated, the method comprising:

a) creating a nonlinear differential equation model of a nonlinear system using initial estimated state variables;

b) obtaining the nonlinear system measurement signals in response to the nonlinear system input signals, wherein the nonlinear differential equation model is given by $\dot{x}=f(x,u)+w$ and $z=h(x,u)+v$ where x is the state $\dot{x}$ is a time derivative of the state variable vector x, f(x,u) is a nonlinear function of x and input vector u, z is a measurement vector which includes function h(x,u) of both x and u, and w and v are mutually independent noise vectors and wherein a state variable estimate, $\hat{x}_k$, for time t=kT is propagated to a state variable estimate, $\hat{x}_{k+1}$, for time t=(k+1)T by integrating the nonlinear differential equation model over a time interval of T as follows:

$$\hat{x}_{k+1} = \hat{x}_k + \int_{s=0}^{T} e^{A_k(T-s)} f_k \, ds,$$

where $f_k = f(\hat{x}_{k|k}, u_k)$ evaluated at time t=(kT), and $A_k$ is a discrete state feedback matrix, evaluated at time t=kT, from a linearized approximation to f(x,u);

c) creating an updated nonlinear differential equation model using the nonlinear differential equation model, the nonlinear system input and measurement signals, and a state variable estimation method for refining the initial estimated state variables, the state variable estimation method for producing updated estimated state variables using integration methods for state variable estimation of the nonlinear system with exogenous inputs, wherein integrating is performed by evaluating a matrix exponential as follows:

$$e^{\begin{pmatrix} A_k & f_k \\ 0 & 0 \end{pmatrix} T} = \begin{pmatrix} e^{A_k T} & \int_0^T e^{A_k(T-s)} f_k \, ds \\ 0 & I \end{pmatrix} = \begin{pmatrix} F_k & G_k \\ 0 & I \end{pmatrix},$$

so that a time propagated state vector is obtained as follows, $$\hat{x}_{k+1|k} = \hat{x}_{k|k} + G_k,$$

and, by QR factorization, an updated conditional square-root covariance, $S_{k+1|k}$, for time (k+1) is obtained from $$\begin{pmatrix} S_{k+1|k}^T \\ 0 \end{pmatrix} = Q \begin{pmatrix} S_{k|k}^T F_k^T \\ Q_k^{T/2} \end{pmatrix}$$

where $S_{k|k}$ is a conditional square-root covariance matrix for time k, $Q_k$ is the process noise vector covariance, Q is a QR transformation matrix, and T represents a matrix transpose operator thereby using a same computational model for updating the estimated state variable and associated covariance;

d) using a discrete-time covariance matrix update; and e) using a common discrete-time time-varying linear system signal model for estimating the updated state variables and a corresponding updated covariance matrix.

2. The method of claim 1 wherein the square-root of the covariance matrix is propagated.

3. The method of claim 1 further comprising a step for simulated annealing by running multiple estimators and choosing the best estimate based on an error metric.

4. The method of claim 3 wherein an increased process noise covariance in the state variable estimation method is used, the increased process covariance generated in accordance with a prescribed schedule that begins by amplifying the initial process noise covariance.

5. The method of claim 1 wherein the state variable estimation method is based on an extended Kalman filter, modified for state variable time propagation by integration.

6. The method of claim 1 further comprising a step for stimulated annealing by running multiple estimators and choosing a best estimate based on an error metric.

7. The method of claim 6 wherein each estimator is initialized by a different random initial state vector.

8. The method of claim 6 wherein the error metric is a scalar value, $c_k$, computed as $$c_k = \text{trace}(S_{k|k} S_{k|k}^T).$$

9. The method of claim 6 wherein an increased process noise covariance is used in the state variable estimation method, the increased process noise covariance generated in accordance with a prescribed schedule that begins by amplifying the initial process noise covariance.

10. The method of claim 9 wherein the prescribed schedule comprises:

a) computing a temperature schedule, $\xi_k$, that decreases as a function of time index k;

b) computing a gain multiplier as $(1+\xi_k)$; and c) multiplying the initial process noise covariance, $Q_0$, by the gain multiplier for producing a process noise covariance at time index k as $Q_k = Q_0(1+\xi_k)$.

11. The method of claim 10 wherein $\xi_k$ is computed as $$\xi_k = \sqrt{2c/\ln(2+kT)},$$

where c is a prescribed constant, and ln(.) is a natural logarithm function.

12. The method of claim 1 further comprising:

a control system method for controlling a nonlinear continuous-time system in which an iterative method for real-time nonlinear system state variable estimation is used, the system represented by a set of continuous-time nonlinear differential equations, input signals representing physical inputs to the system, and measurement signals representing accessible measurements whose values are indicative of the system state variables to be controlled, wherein an estimate of the set of system state variables is made at a current-step using, as a set of initial values, a set of previous-step system state variable estimates obtained from a previous step, the method, at the current step, comprising:

a) creating a nonlinear differential equation model of a nonlinear system using initial estimated state variables;

b) obtaining the nonlinear system measurement signals in response to the nonlinear system input signals; and c) creating an updated nonlinear differential equation model using the nonlinear differential equation model, the nonlinear system input and measurement signals, and a state variable estimation method for refining the initial estimated state variables, the state variable estimation method for producing updated estimated state variables using integration methods for state variable estimation of the nonlinear system with exogenous inputs;

d) estimating an updated covariance of the updated estimated state variables using a common state transition matrix for estimating the updated estimated state variables and the updated covariance for improved estimation quality; and e) computing a controller which uses the set of current-step system state variable estimates produce a set of system input control signals for controlling the physical inputs to the system, the controller is obtained by use of a performance index that specifies an objective performance criterion for the system.

13. A state vector estimation method for a real-time nonlinear system with exogenous inputs, the system represented by a set of continuous-time nonlinear differential state equations that include a state vector representing the system state vector that are to be estimated, and a nonlinear system matrix that defines the functional relationship between the input vector, the state vector, and the time-derivative of the state vector, the state vector being estimated from a set of accessible measurements that are representative of the state variables, the set of measurements, labeled as a measurement vector, taken at prescribed times and represented by a measurement vector, both the state vector and the measurement vector respectively contaminated by a state noise vector and a measurement noise vector, the method comprising the following steps:

(a) constructing a set of state equations representing the nonlinear system with exogenous inputs, wherein the system equation is linearized at the initial value of the state vector, the linearization creating a locally linearized state feedback gain matrix that defines the state vector contribution to the time derivative of the state vector, given the current time input vector, and the current-time state estimate;

(b) establishing a set of state variable values for a current-time state vector, and a set of matrix element values for one each covariance matrix for a current-time state vector, for a current-time state noise vector, for a current-time input noise vector, and for a current-time output measurement noise vector;

(c) acquiring a current-time measurement vector;

(d) updating the state covariance matrices using the current-time measurement noise covariance vector;

(e) estimating an updated current-time state vector from the current time measurement vector by use of a state vector estimating filter that operates on the current-time state vector using the current-time measurement vector, the covariance matrices for the current time state vector, for the current time state, and for the current-time measurement noise vector, the estimated updated state vector representing the state vector at the measurement current-time;

(f) projecting the estimated updated state vector by integrating the system state equations over the prescribed time interval between the prescribed measurement current-time and the next prescribed measurement current-time for obtaining a current state vector using a discrete-time covariance matrix update, wherein the step of updating the state vector is performed by integrating the augmented locally linear state feedback gain matrix using a matrix exponential;

(g) projecting the updated state vector covariance matrix using the results of the system equation integration of step (f) using a common discrete-time time-varying linear system signal model for estimating the updated state variables and a corresponding updated covariance matrix; and (h) at the next measurement time iterate steps (c)–(g).

14. The method of claim 13 wherein the square-root of the state covariance matrices are propagated.

15. The method of claim 13 wherein the updating of the state covariance matrix is performed by a matrix transformation that produces a triangular square-root covariance matrix.

16. The method of claim 15 wherein the matrix transformation is a QR factorization.

17. The method of claim 13 wherein the linearization also creates a locally linearized input gain matrix for relating the input vector contribution to the time derivative of the state vector, given the current state and the current input vector.

18. The method of claim 13 wherein the steps updating the current-time state vector covariance matrix and the step of estimating an updated current-time state vector is not executed because the current-time measurement is not usable or available, and the current-time projected estimated updated state vector, together with the current-time projected updated state vector covariance matrix, are used as the estimated updated current time state vector and updated current time covariance matrix, respectively.

19. The method of claim 13 further comprising:
a control system method for controlling a nonlinear continuous-time system in which an iterative method for real-time nonlinear system state variable estimation is used, the system represented by a set of continuous-time nonlinear differential equations, input signals representing physical inputs to the system, and measurement signals representing accessible measurements whose values are indicative of the system state variables to be controlled, wherein an estimate of the set of system state variables is made at a current-step using, as a set of initial values, a set of previous-step system state variable estimates obtained from a previous step, the method, at the current step, comprising:

a) creating a nonlinear differential equation model of a nonlinear system using initial estimated state variables;

b) obtaining the nonlinear system measurement signals in response to the nonlinear system input signals; and c) creating an updated nonlinear differential equation model using the nonlinear differential equation model, the nonlinear system input and measurement signals, and a state variable estimation method for refining the initial estimated state variables, the state variable estimation method for producing updated estimated state variables using integration methods for state variable estimation of the nonlinear system with exogenous inputs;

d) estimating an updated covariance of the updated estimated state variables using a common state transition matrix for estimating the updated estimated state variables and the updated covariance for improved estimation quality; and f) computing a controller which uses the set of current-step system state variable estimates produce a set of system input control signals for controlling the physical inputs to the system, the controller is obtained by use of a performance index that specifies an objective performance criterion for the system.

20. An iterative method for real-time nonlinear system state vector estimation, the system represented by a set of continuous-time nonlinear differential equations, $$\dot{x}=f(x,u)+w$$

$$z=h(x,u)+v$$

where $\dot{x}$ is the time derivative of the system state vector x, u is the system input vector representing physical inputs to the system, z is the system measurement vector representing accessible measurements whose values are indicative of the system state vector to be estimated, v and w are mutually independent white noise vectors representing measurement noise and process noise respectively, and f(x,u) and h(x,u) are nonlinear functions of x and u, wherein an estimate of a set of system state vector is made at a current-step using, as a set of initial values, a set of previous-step system state vector estimate obtained from a previous step, the method, at the current step, comprising:

(a) performing a measurement update by computing a matrix using a QR factorization, $$\begin{bmatrix} R_{in}^T & K_k^T \\ 0 & S_{k|k}^T \end{bmatrix} = Q \begin{bmatrix} R_k^{T/2} & 0 \\ S_{k|k-1}^T C_{k-1}^T & S_{k|k-1}^T \end{bmatrix} \quad (20)$$

where T is a matrix transpose operator, Q is the QR transformation matrix that is applied to the matrix on the right in the above expression and wherein $R_k$ is the covariance of the measurement noise at time kT, $S_{k|k-1}$ is an estimated conditional square-root state variable covariance matrix at time kT based on prior measurements, and $C_{k-1}$ is a locally linearized output gain matrix corresponding to $h(\hat{x}_{k-1|k-1},u_{k-1})$, for producing an upper triangular matrix on the left of the above equation that contains a Kalman filter gain, $K_k$, and an updated square-root conditional covariance $S_{k|k}$ for updating state vector $\hat{x}_{k|k-1}$ as follows, $$\hat{x}_{k|k}=\hat{x}_{k|k-1}+K_k R_{in}^{-1}(z_k-h(\hat{x}_{k|k-1},u_k));$$

(b) creating a current-step linearized model at time kT, where k is a discrete-time current-step index and T is a discrete-time interval, by obtaining a set of gain matrices relating the current-step set of system state vector estimate to the current-step input signals, and to the set of current-step measurement vector $$\dot{x}=A_k x+B_k u_k$$

$$z_k=C_k x+D_k u_k,$$

for k=1,2, where x is the current state vector, $u_k$ is the current-step input vector, $z_k$ is the current-step measurement vector; and (c) obtaining a time update by integration using matrix exponentiation because $$e^{\begin{bmatrix} A_k & f_k \\ 0 & 0 \end{bmatrix} T} = \begin{bmatrix} e^{A_k T} & \int_0^T e^{A_k(T-s)} f_k ds \\ 0 & I \end{bmatrix} = \begin{bmatrix} F_k & G_k \\ 0 & I \end{bmatrix},$$

so that a time propagated state vector is obtained as follows, $$\hat{x}_{k+1|k} = \hat{x}_{k|k} + G_k,$$

and, by QR factorization, obtaining an updated conditional square-root covariance, $S_{k+1|k}$, for time (k+1) is obtained from $$\begin{bmatrix} S_{k+1|k}^T \\ 0 \end{bmatrix} = Q \begin{bmatrix} S_{k|k}^T F_k \\ Q_k^{T/2} \end{bmatrix}$$

where $S_{k|k}$ is a conditional square-root covariance matrix for time k, Q is a QR transformation matrix, and T is a matrix transpose operator.

21. The method of claim 20 wherein the measurement update step is not performed and $\hat{x}_{k|k} = \hat{x}_{k|k-1}$ and $S_{k|k} S_{k|k-1}$ whenever a current measurement vector is not available.

22. The method of claim 20 wherein $C_{k-1}$ is replaced by computing $C_k$, a locally linearized output gain matrix corresponding to the gain at $h(\hat{x}_{k|k-1}, u_k)$.

23. A method for estimation of state variables of a physical nonlinear system with physical exogenous inputs that can be modeled by a set of continuous-time nonlinear differential equations, including input signals representing the physical exogenous inputs to the system, and measurement signals representing accessible measurements that are indicative of the state variables to be estimated, the method comprising:

a) creating a nonlinear differential equation model of a nonlinear system using initial estimated state variables;

b) obtaining the nonlinear system measurement signals in response to the nonlinear system input signals, wherein the nonlinear differential equation model is given by $\dot{x} = f(x,u) + w$ and $z = h(x,u) + v$ where x is the state $\dot{x}$ is a time derivative of the state variable vector x, f(x,u) is a nonlinear function of x and input vector u, z is a measurement vector which includes function h(x,u) of both x and u, and w and v are mutually independent noise vectors and wherein a state variable estimate, $\hat{x}_k$, for time t=kT is propagated to a state variable estimate, $\hat{x}_{k+1}$, for time t=(k+1)T by integrating the nonlinear differential equation model over a time interval of T as follows:

$$\hat{x}_{k+1} = \hat{x}_k + \int_{s=o}^{T} e^{A_k(T-s)} f_k ds,$$

where $f_k = f(\hat{x}_{k|k}, u_k)$ evaluated at time t=(kT), and $A_k$ is a discrete state feedback matrix, evaluated at time t=kT, from a linearized approximation to f(x,u); and c) creating an updated nonlinear differential equation model using the nonlinear differential equation model, the nonlinear system input and measurement signals, and a state variable estimation method for refining the initial estimated state variables, the state variable estimation method for producing updated estimated state variables using integration methods for state variable estimation of the nonlinear system with exogenous inputs, wherein integrating is performed by evaluating a matrix exponential as follows:

$$e^{\begin{pmatrix} A_k & f_k \\ 0 & 0 \end{pmatrix} T} = \begin{pmatrix} e^{A_k T} & \int_0^T e^{A_k(T-s)} f_k ds \\ 0 & I \end{pmatrix} = \begin{pmatrix} F_k & G_k \\ 0 & I \end{pmatrix},$$

so that a time propagated state vector is obtained as follows, $$\hat{x}_{k+1|k} = \hat{x}_{k|k} + G_k,$$

and, by QR factorization, an updated conditional square-root covariance, $S_{k+1|k}$, for time (k+1) is obtained from $$\begin{pmatrix} S_{k+1|k}^T \\ 0 \end{pmatrix} = Q \begin{pmatrix} S_{k|k}^T F_k \\ Q_k^{T/2} \end{pmatrix}$$

where $S_{k|k}$ is a conditional square-root covariance matrix for time k, $Q_k$ is the process noise vector covariance, Q is a QR transformation matrix, and T represents a matrix transpose operator thereby using a same computational model for updating the estimated state variable and associated covariance.

24. The method of claim 23 further comprising a step for simulated annealing by running multiple estimators and choosing a best estimate based on an error metric.

25. The method of claim 24 wherein an increased process noise covariance is used in the state variable estimation method, the increased process noise covariance generated in accordance with a prescribed schedule that begins by amplifying the initial process noise covariance.

26. The method of claim 25 where in the prescribed gain schedule comprises:

a) computing a temperature schedule, $\xi_k$, that decreases as a function of time index k;

b) computing a gain multiplier as $(1+\xi_k)$; and c) multiplying the initial process noise covariance, $Q_0$, by the gain multiplier for producing a process noise covariance at time index k as $Q_k = Q_0(1+\xi_k)$.

27. The method of claim 26 wherein $\xi_k$ is computed as $$\xi_k = \sqrt{2c/\ln(2+kT)},$$

where c is a prescribed constant, and ln(.) is a natural logarithm function.

28. The method of claim 24 wherein each estimator is initialized by a different random initial state vector.

29. The method of claim 24 wherein the error metric is a scalar value, $c_k$, computed as $c_k = \text{trace}(S_{k|k} S_{k|k}^T)$.

30. A state vector estimation method for a real-time nonlinear system with exogenous inputs, the system represented by a set of continuous-time nonlinear differential state equations that include a state vector representing the system state vector that are to be estimated, and a nonlinear system matrix that defines the functional relationship between the input vector, the state vector, and the time-derivative of the state vector, the state vector being estimated from a set of accessible measurements that are representative of the state variables, the set of measurements, labeled as a measurement vector, taken at prescribed times and represented by a measurement vector, both the state vector and the measurement vector respectively contaminated by a state noise vector and a measurement noise vector, the method comprising the following steps:

(a) constructing a set of system state equations representing the nonlinear system with exogenous inputs, wherein the system equation is linearized at the initial value of the state vector, the linearization creating a locally linearized state feedback gain matrix that defines the state vector contribution to the time derivative of the state vector, given the current time input vector, and the current-time state estimate;

(b) establishing a set of state variable values for a current-time state vector, and a set of matrix element values for one each covariance matrix for a current-time state vector, for a current-time state noise vector, for a current-time input noise vector, and for a current-time output measurement noise vector;

(c) acquiring a current-time measurement vector;

(d) updating the state covariance matrices using the current-time measurement noise covariance vector;

(e) estimating an updated current-time state vector from the current time measurement vector by use of a state vector estimating filter that operates on the current-time state vector using the current-time measurement vector, the covariance matrices for the current time state vector, for the current time state, and for the current-time measurement noise vector, the estimated updated state vector representing the state vector at the measurement current-time;

(f) projecting the estimated updated state vector by integrating the system state equations over the prescribed time interval between the prescribed measurement current-time and the next prescribed measurement current-time for obtaining a current state vector, wherein the step of updating the state vector is performed by integrating the augmented locally linear state feedback gain matrix using a matrix exponential;

(g) projecting the updated state vector covariance matrix using the results of the system equation integration of step (f); and (h) at the next measurement time iterate steps (c)–(g).

31. The method of claim 30 wherein the square-root of the state covariance matrices are propagated.

32. The method of claim 30 wherein the updating of the state covariance matrix is performed by a matrix transformation that produces a triangular square-root covariance matrix.

33. The method of claim 32 wherein the matrix transformation is a QR factorization.

34. The method of claim 30 wherein the linearization also creates a locally linearized input gain matrix for relating the input vector contribution to the time derivative of the state vector, given the current state and the current input vector.

* * * * *